(12) United States Patent
Meeker et al.

(10) Patent No.: US 11,720,831 B2
(45) Date of Patent: Aug. 8, 2023

(54) OPTIMAL CONTROL TECHNOLOGY FOR DISTRIBUTED ENERGY RESOURCES

(71) Applicant: The Florida State University Research Foundation, Inc., Tallahassee, FL (US)

(72) Inventors: Richard H. Meeker, Tallahassee, FL (US); Md Omar Faruque, Tallahassee, FL (US); Juan Ospina, Tallahassee, FL (US); Alvi Newaz, Tallahassee, FL (US); Emmanuel Collins, Tallahassee, FL (US); Griffin Francis, Newton, MA (US); Nikhil Gupta, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 282 days.

(21) Appl. No.: 17/324,733

(22) Filed: May 19, 2021

(65) Prior Publication Data
US 2021/0281076 A1    Sep. 9, 2021

Related U.S. Application Data

(63) Continuation of application No. 16/049,785, filed on Jul. 30, 2018, now Pat. No. 11,043,815.
(Continued)

(51) Int. Cl.
*G06Q 10/04* (2023.01)
*G06Q 30/02* (2023.01)
(Continued)

(52) U.S. Cl.
CPC .......... *G06Q 10/04* (2013.01); *G05B 13/027* (2013.01); *G05B 13/048* (2013.01);
(Continued)

(58) Field of Classification Search
None
See application file for complete search history.

(56) References Cited

U.S. PATENT DOCUMENTS 8,457,802 B1    6/2013   Steven et al.
8,583,520 B1   11/2013   Forbes, Jr.
(Continued)

FOREIGN PATENT DOCUMENTS

| CA | 2870452 A1 | * | 10/2012 | ........... G05B 13/021 |
|---|---|---|---|---|
| CN | 102184475 A | | 10/2013 | |
| CN | 105207267 A | | 12/2015 | |

OTHER PUBLICATIONS

Zhou et al., "Optimal load distribution model of microgrid in the smart grid environment", Sep. 2013, Renewable and Sustainable Energy Reviews 35 (2014) 304-310. (Year: 2013).*
(Continued)

*Primary Examiner* — Mohammad Ali
*Assistant Examiner* — Kelvin Booker
(74) *Attorney, Agent, or Firm* — Eversheds Sutherland (US) LLP

(57) ABSTRACT

Devices and methods of allocating distributed energy resources (DERs) to loads connected to a microgrid based on the cost of the DERs are provided. The devices and methods may determine one or more microgrid measurements. The devices and methods may determine one or more real-time electricity prices associated with utility generation sources. The devices and methods may determine one or more forecasts. The devices and methods may determine a cost associated with one or more renewable energy sources within the microgrid. The devices and methods may determine an allocation of the renewable sources to one or more loads in the microgrid.

17 Claims, 14 Drawing Sheets

Related U.S. Application Data

(60) Provisional application No. 62/538,637, filed on Jul. 28, 2017.

(51) Int. Cl.

| | | |
|---|---|---|
| *G06Q 50/06* | (2012.01) | |
| *G05B 13/02* | (2006.01) | |
| *G05B 13/04* | (2006.01) | |
| *H02J 3/38* | (2006.01) | |
| *H02J 3/14* | (2006.01) | |
| *H02J 3/32* | (2006.01) | |
| *H02J 3/48* | (2006.01) | |
| *H02J 3/50* | (2006.01) | |
| *G06Q 30/0201* | (2023.01) | |
| *H02J 3/00* | (2006.01) | |
| *H02J 13/00* | (2006.01) | |

(52) U.S. Cl.
CPC ......... *G06Q 30/0206* (2013.01); *G06Q 50/06* (2013.01); *H02J 3/007* (2020.01); *H02J 3/0075* (2020.01); *H02J 3/14* (2013.01); *H02J 3/32* (2013.01); *H02J 3/38* (2013.01); *H02J 3/381* (2013.01); *H02J 3/48* (2013.01); *H02J 3/50* (2013.01); *H02J 3/003* (2020.01); *H02J 13/00002* (2020.01); *H02J 2203/20* (2020.01); *H02J 2300/24* (2020.01); *Y04S 50/12* (2013.01)

(56) References Cited

U.S. PATENT DOCUMENTS

| | | | |
|---|---|---|---|
| 9,461,471 B2 | 10/2016 | Forbes, Jr. | |
| 9,489,701 B2* | 11/2016 | Emadi | G06Q 50/06 |
| 9,564,757 B2 | 2/2017 | Wang et al. | |
| 9,568,901 B2 | 2/2017 | Hooshmand et al. | |
| 10,890,904 B2 | 1/2021 | Turney et al. | |
| 2010/0114397 A1* | 5/2010 | Cardinal | H02J 13/00034 |
| | | | 700/297 |
| 2010/0179704 A1 | 7/2010 | Ozog | |
| 2010/0198421 A1 | 8/2010 | Fahimi et al. | |
| 2011/0082597 A1 | 4/2011 | Meagher | |
| 2011/0231028 A1 | 9/2011 | Ozog | |
| 2012/0130556 A1 | 5/2012 | Marhoefer | |
| 2012/0150359 A1 | 6/2012 | Westergaard | |
| 2012/0232701 A1 | 9/2012 | Carty et al. | |
| 2012/0296482 A1 | 11/2012 | Steven et al. | |
| 2013/0015703 A1 | 1/2013 | Rouse et al. | |
| 2013/0024042 A1 | 1/2013 | Asghari et al. | |
| 2013/0046668 A1* | 2/2013 | Al Faruque | G06Q 50/06 |
| | | | 705/35 |
| 2013/0076140 A1 | 3/2013 | Darden et al. | |
| 2013/0079939 A1 | 3/2013 | Darden et al. | |
| 2013/0079943 A1 | 3/2013 | Darden et al. | |
| 2013/0134780 A1 | 5/2013 | Parsonnet | |
| 2014/0058571 A1 | 2/2014 | Hooshmand et al. | |
| 2014/0094979 A1* | 4/2014 | Mansfield | H02J 3/381 |
| | | | 700/291 |
| 2014/0129040 A1* | 5/2014 | Emadi | G06Q 50/06 |
| | | | 700/291 |
| 2014/0156095 A1 | 6/2014 | Rouse et al. | |
| 2014/0200723 A1* | 7/2014 | Roy | H02J 3/46 |
| | | | 700/291 |
| 2014/0229031 A1* | 8/2014 | Amarin | H02J 3/00 |
| | | | 700/295 |
| 2014/0277788 A1 | 9/2014 | Forbes, Jr. | |
| 2014/0297051 A1* | 10/2014 | Zhang | G06Q 50/06 |
| | | | 700/287 |
| 2014/0304025 A1 | 10/2014 | Steven et al. | |
| 2014/0330611 A1 | 11/2014 | Steven et al. | |
| 2014/0330695 A1 | 11/2014 | Steven et al. | |
| 2014/0350743 A1 | 11/2014 | Asghari et al. | |
| 2015/0012144 A1 | 1/2015 | Wang et al. | |
| 2015/0088576 A1 | 3/2015 | Steven et al. | |
| 2015/0261240 A1 | 9/2015 | Mokhtari et al. | |
| 2016/0043550 A1 | 2/2016 | Sharma et al. | |
| 2016/0203569 A1 | 7/2016 | Forbes, Jr. et al. | |
| 2016/0224045 A1 | 8/2016 | Wong et al. | |
| 2016/0241031 A1 | 8/2016 | Hooshmand et al. | |
| 2016/0313716 A1 | 10/2016 | Chen et al. | |
| 2017/0358041 A1 | 12/2017 | Forbes, Jr. et al. | |
| 2017/0371308 A1 | 12/2017 | Ghosh et al. | |
| 2018/0225614 A1 | 8/2018 | Bahramirad et al. | |
| 2018/0226800 A1 | 8/2018 | Bhattarai et al. | |
| 2019/0181680 A1 | 6/2019 | Magnani et al. | |
| 2020/0059098 A1 | 2/2020 | Dong et al. | |
| 2020/0176984 A1 | 6/2020 | Bota et al. | |

OTHER PUBLICATIONS

Zheng et al., "Distributed Model Predictive Control for On-Connected Microgrid Power Management", Feb. 2016, IEEE Transactions on Control Systems Technology, vol. 26, No. 3, May 2018. (Year: 2016).*

Parisio et al., "Use of model predictive control for experimental microgrid optimization", Jun. 2013, Applied Energy 115 (2014) 37-46. (Year: 2013).*

Parisio et al., "A Model Predictive Control Approach to Microgrid Operation", May 2013, IEEE Transactions on Control Systems Technology, vol. 22, No. 5, Sep. 2014. (Year: 2013).*

Ospina et al., "Sampling-Based Model Predictive Control of PV-Integrated Energy Storage System Considering Power Generation Forecast and Real-Time Price", Apr. 2019, IEEE Power and Energy Technology Systems Journal, vol. 6, No. 4, Dec. 2019. (Year: 2019).*

Du et. al., "Real-time microgrid economic dispatch based on model predictive control strategy", Oct. 2016, J. Mod. Power Syst. Clean Energy (2017) 5(5):787-796. (Year: 2016).

Hooshmand, A.; Malki, H .A. and Mohammadpour, J ., "Power flow management of microgrid networks using model predictive control", Computers and Mathematics with Applications 64 (2012) 869-876. (Year: 2012).

Jaboulay, P.; Zhu, W.; Niu, X.; Pan, X.; and Gao, S., "Real-time energy management optimization using model predictive control on a microgrid demonstrator", 2017, First IEEE International Conference on Energy Internet. (Year 2017).

Nelson et. al., "Model predictive control of microgrids for real-time ancillary service market participation", Dec. 2019, Applied Energy 269 (2020) 114963. (Year: 2019).

Oh, S.; Chae, S.; Neely, J.; Baek, J.; and Cook, M., "Efficient Model Predictive Control Strategies for Resource Management in an Islanded Microgrid", Feb. 2017, Energies 2017, 10, 1008; doi:10.3390/en10071008. (Year: 2017).

Parisio et. al., "A Model Predictive Control Approach to Microgrid Operation Optimization", May 2013, IEEE Transactions on Control Systems Technology, vol. 22, No. 5, Sep. 2014. (Year: 2013).

Reese, B.M. and Collins Jr, E.G., "A graph search and neural network approach to adaptive nonlinear model predictive control", Nov. 2015, Engineering Applications of Artificial Intelligence 55 (2016) 250-268. (Year: 2015).

Sechilariu et al., "Supervision control for optimal energy cost management in DC microgrid: Design and simulation", Jan. 2013, Electrical Power and Energy Systems 58 (2014) 140-149. (Year: 2013).

Zhang, T.; Zhang, V.; Lei, H.; Guo, B. and Zha, Y.,"Optimal Microgrid Operation Based on Model Predictive Control Framework", 2017, 2017 3rd International Conference on Control, Automation and Robotics. (Year: 2017).

* cited by examiner

OPTIMAL CONTROL TECHNOLOGY FOR DISTRIBUTED ENERGY RESOURCES

CROSS-REFERENCE TO RELATED PATENT APPLICATION

This application is a continuation of U.S. application Ser. No. 16/049,785 filed on Jul. 30, 2018, which claims priority to U.S. Provisional Patent Application No. 62/538,637 filed Jul. 28, 2018, the disclosure of which is incorporated by reference as set forth in full.

STATEMENT REGARDING FEDERALLY SPONSORED RESEARCH OR DEVELOPMENT

This invention was made with government support under contract number DE-SC0015936 awarded by U.S. Department of Energy. The government has certain rights in the invention.

TECHNICAL FIELD

This disclosure generally relates to systems and methods for managing electric power grid resources and, more particularly, managing and allocating high penetration levels of photovoltaic, energy storage, and other distributed energy resources (DERs) in electric power grid systems to meet user demand.

DETAILED DESCRIPTION

Figure 1:
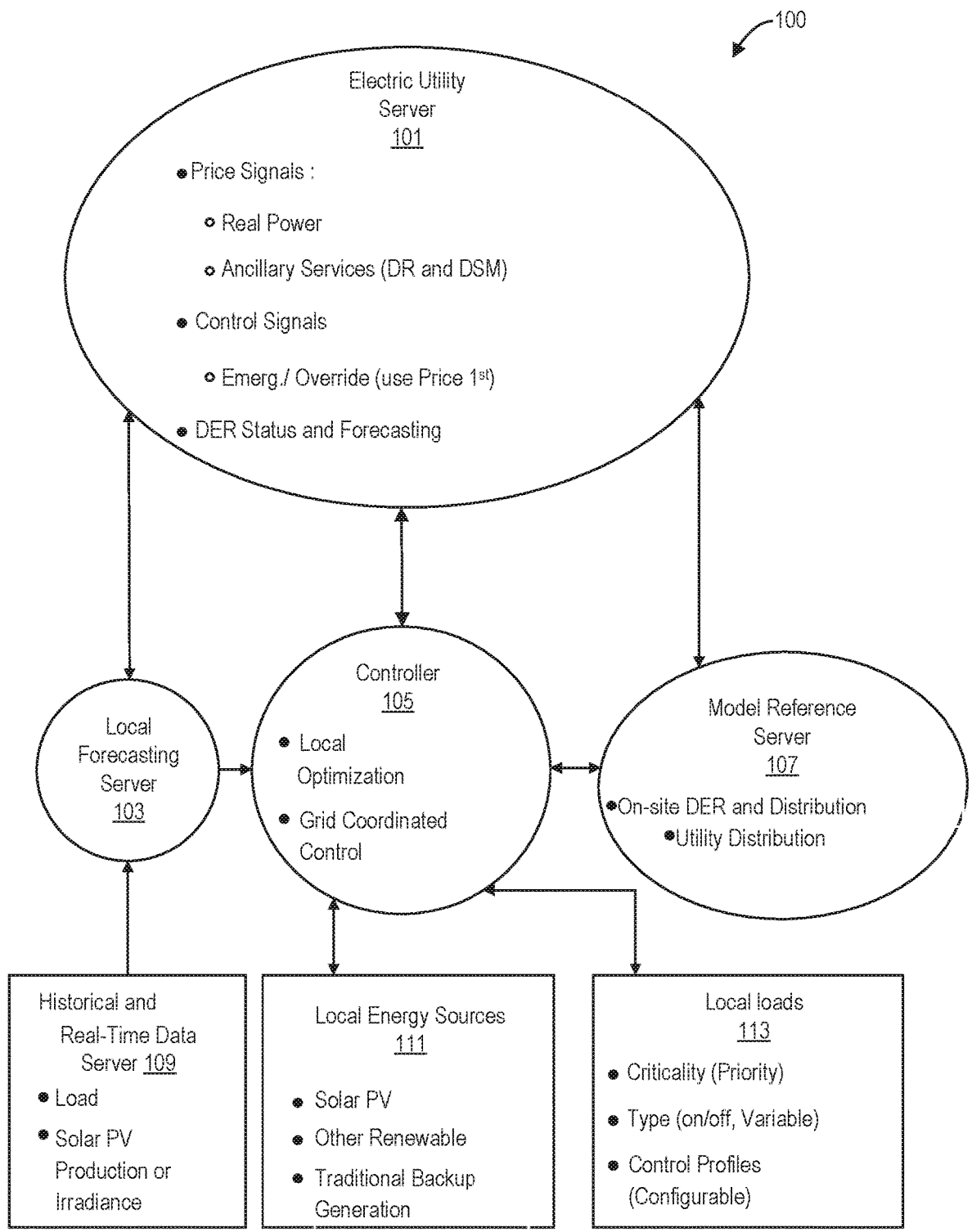
FIG. 1 depicts a logical interaction between a controller and utilization of resources, including solar energy and local loads, according to one or more example embodiments of the disclosure.

This disclosure uses a predictive model in order to predict the cost of energy in real time. In addition, it can predict the cost of energy in the future. The disclosed example model uses load (on the grid), weather (for solar panels and wind turbines), time of day, and other factors in order to predict the cost of energy. Knowing when energy costs are the highest/lowest may allow devices on consumers' premises to make informed decisions as to how to behave regarding energy consumption. This may enable consumer premises to charge battery packs, cars, etc. when consumption is lowest/cheapest and use or sell battery power when costs are the highest. In particular, the cost associated with one or more distributed energy resources (DERs) (e.g., battery storage, solar PV resources, and/or wind energy resources) are allocated, or turned on or turned off, to match the demand for power at one or more loads based on the cost associated with the DERs. Toggling the DERs reduces strain on the grid as a whole, and minimizes the cost associated with the transportation of power using traditional resources such as coal, natural gas, nuclear, petroleum, diesel, and hydroelectric. Part of the reason why the cost can be minimized is because DERs are integrated into what is called a microgrid which is located within a residential, industrial, and/or commercial neighborhood. The microgrid comprises the DERs and power lines that connect the DERs to the one or more loads within the residential, industrial, and/or commercial neighborhood. Because the DERs are located closer to the one or more loads as opposed to traditional power resources, the cost to transfer the power from the resources to the one or more load can be greatly reduced. The microgrid may comprise one or more DERs, some of which may be cheaper to use than some of the other one or more DERs. Accordingly, the cost to a consumer may be reduced even further if the one or more DERs are allocated to the one or more loads based on a selection of the cheapest DERs of the one or more DERs at a given point in time. This disclosure explains a method that accomplishes the task of allocating the one or more DERs to the one or more loads based on the costs of the one or more DERs.

A framework has been conceived and functionally defined that includes a two-level control architecture. The first level (Level 1) is generally referred to as the smart enterprise energy management system (SEEMS). The SEEMS can optimize local distributed energy resources (DERs) and responsive load, including real-time real-power and ancillary services pricing information from the utility to evaluate the trade-space between the local use of resources and export of resources in support of the utility grid, distribution system. The second level (Level 2) is generally referred to as the distribution optimal control system (DOCS). The DOCS can be a utility supervisory control and/or advanced distribution management system application that works with multiple distributed SEEMS to optimally coordinate and control real and reactive power over an area populated with DER. An optimal real-time control approach that uses a constrained sampling based model predictive control (SBMPC) method may be adapted to the DER allocation problem. The SBMPC can be a market-based solution with a cost minimization objective function. The market-based approach may make it possible to achieve an efficient allocation of resources for energy and ancillary services that may address the needs of multiple stakeholders, including the DER owners, the electric utility, and the energy consumers. This disclosure provides a high level of control and optimization capability at both the SEEMS and the DOCS level. The two-level control architecture is advantageous for future high-penetration photovoltaic (PV) integration, such as solar. PV at high-penetration levels, should work optimally as part of the local on-site, customer-side system of loads and resources, as well as function in an integrated fashion with the utility, particularly medium and larger size systems. Optimizing use of resources in real-time, considering variation in intermittent generation, load, and real-time price of grid-supplied energy may be accomplished with the computational tools that include current and forecasted system state, as disclosed herein.

An advanced optimal resource allocation (AURA) controller is provided for solar and DERs, to address the complexities of optimizing and matching resources in real-time, based on the cost of the resources and any intermittent generation issues of the resources, with the load at consumers' premises. The AORA controller of solar and DER at the SEEMS level was formulated as an optimal control problem, with the flexibility to optimize the allocation of multiple DER, including responsive load.

Grid-connected solar PV resource generation continues to experience substantial growth. In 2016, 14.76 MW DC of new capacity was installed in the U.S., nearly double that installed the year prior. Continued growth is expected with the total installed solar PV resource capacity in the U.S. expected to nearly triple over the next 5 years. Studies suggests that economic and operational issues will arise at very high penetration levels of solar PV resources in the electric power system due to the resulting and expected imbalance of supply and demand. A key to extracting the full value from solar PV resources and allowing greater levels of penetration may be in considering the value proposition of solar PV resources in the context of the entire electric power system and in combination with other resources. Solar PV resources have the potential to improve economics of the entire power system In many cases, grid-connected solar PV resources that are not utility-owned continue to be primarily deployed under one of two basic frameworks: 1) to reduce or eliminate metered load, through net-metering programs, or, 2) to sell real power production to the utility through a power purchase agreement (PPA). When planned for and deployed into the electric power system in this relatively unsophisticated way, solar PV resource penetration, or at least utilization, may be limited due to imbalance of generation and load in the grid at certain times as a result of the intermittence (non-dispatchability) of solar PV resources and the imperfect alignment of load and the solar resource.

The nature and characteristics of DER, such as solar, wind, energy storage, and different types of loads, vary considerably. These wide-ranging characteristics, coupled with the fact that both the loads and certain renewable energy resources like solar and wind are highly variable, compound the challenges of traditional system planning and economic dispatch. A solution provided in the present disclosure includes a greater degree of real-time control and responsiveness in the grid, particularly all the way down to the distribution system. Moreover, control provided by the present disclosure can inherently incorporate prediction of variation in resources and loads, and even pricing, can provide a game-changing, leap-ahead improvement in the ability to successfully achieve high levels of deployment and derive real consumer benefit from increased penetration of solar and other DER.

This disclosure is directed to a solution that provides real-time dynamic coordination, response, and control necessary to manage high penetration levels of solar PV resources and DERs, including controllable or price response load. This may begin at the retail level, to allow smoother control and monitoring of the energy resources and loads in real time, balancing the consumer and the utility's objectives. Using real-time and forecasted information of the demand for electricity (load), the generation resource, and the price can postulate as a real alternative that could help stabilize the supply and demand of electricity to consumer premises. The solution present in the disclosure may include both a technology and a scalable framework that addresses the necessary level of coordination and control from the point of consumption up through the power system, where from an operational point of view, the generation, transmission, and distribution may increasingly be viewed as a whole.

The devices, methods, and systems disclosed herein may improve coordination and control of the dispatch of solar PV resources and DER, and the matching of the dispatched solar PV resources and DER to load at consumer premises, using, for example, forecasts of the price of energy (e.g., real time pricing (RTP)), availability of solar PV resources, wind, or DER. A neural network may be used to forecast the energy consumed based on the current price of energy and usage data, and the forecasted energy and usage data may then be used to regulate loads accordingly. It is proposed that energy consumption can be scheduled based on the real time price and the priority of the appliances. Unlike many renewable energy resource controllers, the devices, methods, and systems disclosed herein take into account the intermittent availability of, solar PV resources or DER, and forecast the RTP based on weather and other variables. This disclosure provides a control framework and solution for optimal allocation of solar PV resources in combination with other distributed energy resources (DER) including energy storage and variable load, in coordination with utility system operation and control.

FIG. 1 depicts a logical interaction between a controller and electric utility, forecasting server, model reference server, historical and real-time renewable energy resource data server, model reference server, local load server, and electric utility server, according to one or more example embodiments of the disclosure. Controller 105 may be a controller located at a point of common coupling between an electric distribution system and a microgrid. In some embodiments, a microgrid may be a group of interconnected loads and DERs operating within clearly defined electrical boundaries, and that act as a single controllable entity with respect to a utility electric power grid. In some embodiments, a microgrid may connect and disconnect from the utility's electric power grid to enable it to operate in both connected or island-mode. In some embodiments, the microgrid may comprise Low-Voltage (LV) distribution systems with DERs (for example microturbines, fuel cells, photovoltaics (PV), etc.), storage devices (for example, batteries, flywheels) energy storage system and flexible loads. Flexible loads may be loads controlled by controller 105. For example, a flexible load may be a pool pump or heating and ventilation and air conditioning (HVAC) unit that can be controlled by controller 105, For instance, controller 105 may control the duty cycle of the pool pump or HVAC throughout a day to reduce or shed load during times when demand for electricity by loads in the distribution system exceeds the supply of electricity for the loads. The supply of electricity may be provided by the utility distribution system or the microgrid. Microgrids can operate either connected or disconnected from the electric power grid.

Controller 105 may optimize the allocation of renewable energy resources to match the demand of loads in a microgrid, with respect to cost of energy to consumers. For example, in some embodiments controller 105 may receive electric power data from one or more loads indicating the amount of electricity being consumed (demand) and may also receive electric power data from one or more renewable energy resources indicating the amount of electricity being generated (supply). Controller 105 may allocate the one or more resources to the loads based on cost associated with allocating the one or more resources to those loads. For example, controller 105 may determine that the cost associated with allocating a solar PV resource to supply power to meet the demand of power consumed by a load at a certain time, is more affordable than allocating a traditional backup generator, or discharging a battery source. Accordingly, controller 105 may allocate the solar PV resources to supply power to meet the demand for power by the load.

Controller 105 may receive a forecast of the electric power data associated with the one or more loads from historical and real-time renewable energy resource data server (e.g., Historical and Real-Time Data Server 109) via a forecasting server (e.g., local forecasting server 103). Historical and Real-Time Data Server 109 may receive a forecast of future power consumption, of the one or more loads, based on signals received at local forecasting server 103, from one or more loads attached to the microgrid. Historical and Real-Time Data Server 109 may receive a forecast of future availability of one or more renewable energy resources, and the amount of power that may be produced by the one or more renewable energy resources, based on signals received at local forecasting server 103, from one or more renewable energy resources such as solar PV resources. In particular, the signals received from each of the one or more loads may indicate the amount of power consumed in real-time. Historical and Real-Time Data Server 109 may store data associated with these signals in storage or memory as historical information about the power consumed by each of the one or more loads. In some instances, this data may be used to determine a historical power consumption profile associated with each of the one or more loads. Historical and Real-Time Data Server 109 may receive signals from each of the one or more renewable energy resources about the amount of power that can be reliably supplied to meet the amount of power consumed by the one or more loads. Historical and Real-Time Data Server 109 may store data associated with these signals may be received and stored in storage or memory as historical information about the power produced by each of the one or more renewable energy resources over time. In some instances, this data may be used to determine a historical power production profile associated with each of the one or more renewable energy source. For instance, Historical and Real-Time Data Server 109 may receive and store irradiance data associated with solar PV resources, a wind turbine, or battery storage. Local forecasting server 103 may receive this data, which may include the historical power production profile, from the historical and real-time data server 109 and determine a forecast that can be used by the controller 105 to determine the allocation of renewable energy resources.

Local energy sources 111 may be a collection of the one or more renewable energy resources. Each of the one or more renewable energy resources may comprise power electronics. In some embodiments, the renewable energy resources may include, but are not limited to, solar PV sources, wind, piezoelectric energy scavenging devices, or other renewable energy resources, or traditional backup generation (e.g., electric generator powered by diesel or petrol). Controller 105 may send control signals to the power electronics of the one or more renewable energy resources of the local energy sources 111 that cause one or more of the renewable energy resources to supply power to the one or more loads, such as local loads 113.

Local loads 113 consume power and may generate data associated with the amount of power being generated by the one or more loads. In some embodiments, the behavior of the one or more loads may also be recorded in the data. The behavior, may indicate whether the one or more loads are consuming power efficiently or inefficiently. For example, if the reactive power or voltage of the one or more loads are not operating within certain operating limits, this could result in drastic swings in the reactive power and voltage in the microgrid thereby damaging power electronics responsible for delivering real power to the one or more loads. This information may be included in the data. Each of the one or more loads may comprise power electronics. In some embodiments, the data may include, but is not limited to, whether each of the one or more loads are on/off loads, or loads with variable settings. The data may further include the criticality of the load. For example, a first load (e.g., a hospital), of the one or more loads, may be assigned a higher level of criticality than a second load (e.g., a residential apartment building), of the one or more loads. The hospital may be assigned a higher level of criticality because the hospital needs power to keep patients alive, but power provided to a residential apartment building may be intermittently disabled to meet the power demand of the hospital. Accordingly, controller 105 may supply power to the hospital but may disable power intermittently to the residential apartment building, when the demand for power by the one or more loads exceeds the available supply of power. The data in local loads 113 may also include control profiles of the one or more loads. Control profiles of the load could be predetermined load profiles or assigned load profiles that should be followed. For example, a control profile may be a set of instructions that cause controller 105 to send control signals to local loads 113, with instructions that cause local loads 113 to operate within certain limits. For instance, a heating ventilation and air conditioning (HVAC) may be programmed to operate within certain voltage, real power, and reactive power limits, and these limits may correspond to a load profile.

Model reference server 107 may be a server storing data modeling the DERs and the distribution of power from the DERs to the one or more loads. Model reference server 107 may also store data modeling of the utility distribution system and the distribution of power from the utility distribution system to the one or more loads. The connection between the DERs and the one or more loads may for a microgrid, and the power may be distributed between the DERs and the one or more loads constituting a microgrid distribution system. Controller 105 may use the data modeling the DERs and the distribution of power from the DERs to the one or more loads to optimize the allocation of renewable energy resources to match the demand of loads in the microgrid. This may be referred to as a local optimization. Controller 105 may use the data modeling of the utility distribution system and the distribution of power from the utility distribution system to the one or more loads in the microgrid to enable coordinated control of the utility distribution system and the microgrid. This may be referred to as grid-coordinated control. For example, controller 105 may coordinate the distribution of power from the utility distribution system to the one or more loads, with the distribution of power from the DERs to the one or more loads. For instance, controller 105 may allocate a utility distribution system owned resource (e.g., solar, wind, coal fired, hydroelectric, nuclear, or natural gas) to meet the demand of one or more loads associated with a first microgrid when the first microgrid is attached to the utility distribution system. While controller 105 is allocating utility distribution system owned resources to the first microgrid, controller 105 may allocate one or more DERs to meet the demand of one or more loads in a second microgrid when the second microgrid is not attached to the utility distribution system. Controller 105 may make these allocations based on the data in model reference server 107.

Model reference server 107 may receive price signals associated with the price of power provided by the utility distribution system via electric utility server 101. The price signals may be prices associated with real power and/or ancillary services including but not limited to demand response (DR) and/or demand side management (DSM) signals.

The DR signal may be used by model reference server 107 to determine how a microgrid may respond after the one or more loads receive the DR signal. The DR signal may be designed to cause the one or more loads to make short-term reductions in power consumption in response to a price signal from the electricity hourly market, or a trigger initiated by electric utility server 101. For example, the one or more loads may reduce power consumption in response to a price signal exceeding a certain price. Model reference server 107 may model the stability and availability of DERs in the microgrid and the stability and availability of resources in response to the price signal exceeding a certain price. In some embodiments, power consumption may be reduce or curtailed to within 1 to 4 hours, and may include turning off or dimming banks of lighting, adjusting HVAC levels, or shutting down a portion of a manufacturing process. Alternatively, DERs in the microgrid may be used to displace load drawn from the utility, distribution system.

Local forecasting server 103 may generate forecasts for the power demand of the one or more loads and the power supply of DERs or solar PV resources. The forecasts may be based on historical and/or real-time data of the demand of the one or more loads and the supply of power by the DERs or solar PV resources in historical and real-time data server 109. Local forecasting server 103 may send forecasts to electric utility server 101. Local forecasting server 103 may use a one or more of the neural networks described herein to forecast the demand of the one or more loads and the supply of the one or more DERs or solar PV resources.

Electric utility server 101 may send price signals including real power price signals, ancillary services signals including, but not limited to DR signals and DSM signals, control signals including, but not limited to emergency/override signals. Electric utility server 101 may receive DER status signals from controller 105 and/or model reference server 107. Electric utility server 101 may receive forecasting signals from local forecasting server 103.

Figure 2:
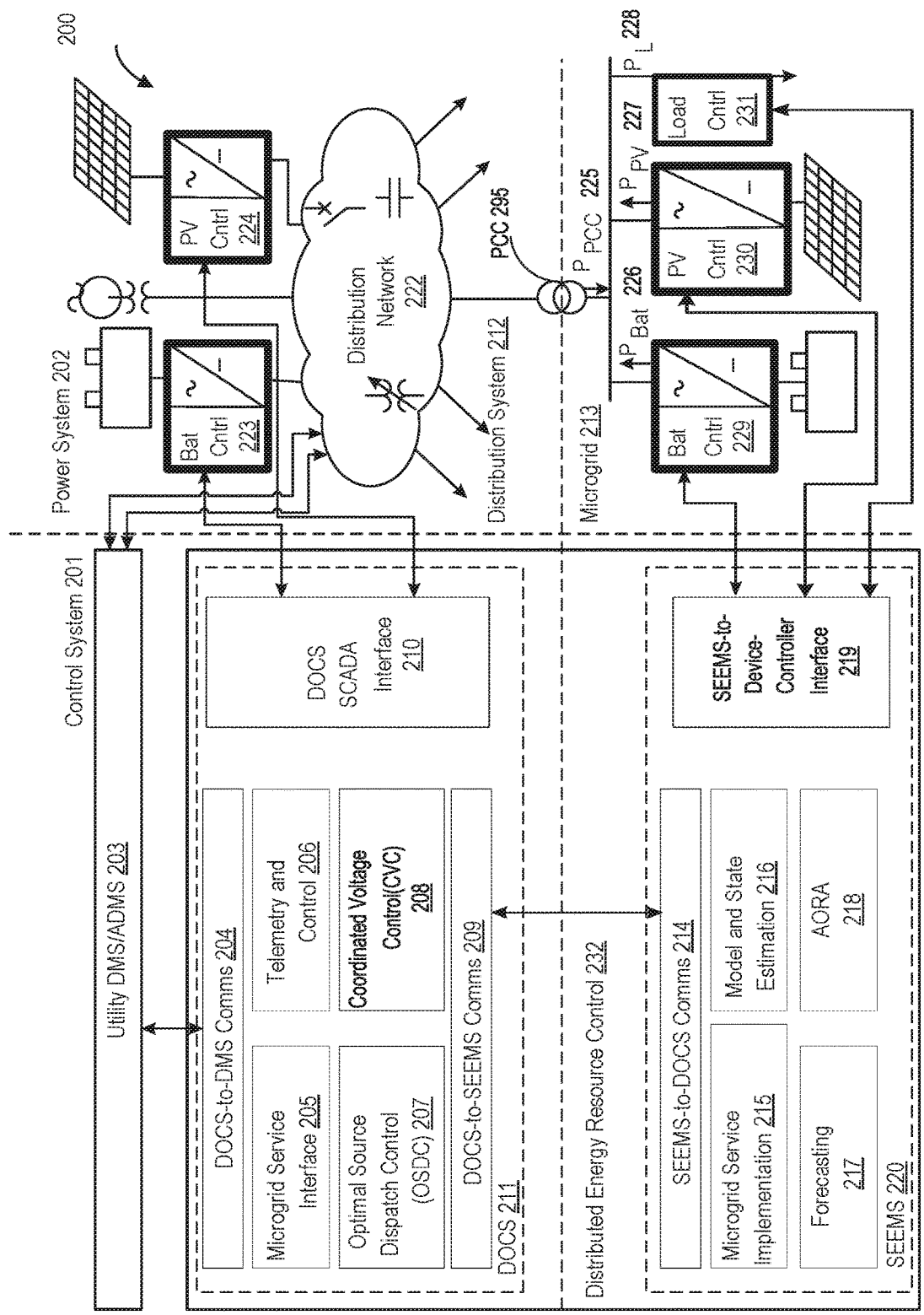
FIG. 2 depicts the control plane and power plane of a utility distribution system and microgrid, according to one or more example embodiments of the disclosure.

FIG. 2 depicts the control and power plane 200 of a utility distribution system and microgrid, according to one or more example embodiments of the disclosure.

Control and power plane 200 logically illustrates how control signals are transferred between a utility distribution system and a microgrid, and how power is transferred between a distribution network, associated with the utility distribution system, and a microgrid bus bar associated with the microgrid. Control signals are sent between a utility distribution system and microgrid to ensure that real power and reactive power seamlessly flow between the distribution network and bus bars within a microgrid. More specifically, the controls signals may control one or more power electronics connecting the distribution network to the one or more bus bars in the microgrid, which in turn control the flow of real and reactive power across the connection between the distribution network and the one or more bus bars. Distributed energy resource control 232 comprise one or more of the components of controller 105. The microgrid 213 components of distributed energy resource control 232 cause controller 105 to optimize the allocation of distributed energy resources and coordinate control of the utility distribution system with the control of the microgrid.

Control system 201 logically illustrates how one or more components of distribution system 212, are communicatively coupled to one or more components in microgrid 213. Distributed energy resource control 232 comprises distribution system 212 and microgrid 213. Signals may be sent between distribution system 212 and utility DMS/ADMS 203. Utility DMS/ADMS 203 may be a distribution management system (DMS) comprising one or more power electronics or advanced distribution management system (ADMS) comprising one or more power electronics.

DOCS 211 is a distribution optimal control system (DOCS), and is part of the distribution system 212. The DOCS is the top-level control designed to perform utility system level monitoring, control, and optimization by sending appropriate signals to SEEMS controllers, described above as a Level 2 control. The DOCS function within the overall framework is illustrated in FIG. 2. DOCS 211 may be responsible for sending and receiving control signals between utility DMS/ADMS 203 and SEEMS 220. In particular, DOCS 211 may be responsible for the coordination of the control of the utility distribution system 212 with the control of the microgrid, for example, in controller 105 of FIG. 1, More specifically, DOCS 211 may send control signals to SEEMS 220 to enable control of voltage and reactive power that may be introduced to bus bars associated with the microgrid at a point of common coupling (PCC). For example, DOCS 211 may transmit one or more coordinated voltage control signals, generated by coordinated voltage control (CVC) 208, to SEEMS 220, in order for SEEMS 220 to control voltage that may be received from the utility distribution network at the bus bars in the microgrid.

The DOCS 211 can be used at the substation level involving multiple feeders or one individual feeder. DOCS 211 may provide reference voltage points/bands to an individual microgrid (e.g., microgrid 213) via SEEMS (e.g., SEEMS 220). Coordinated Voltage Control (CVC) 208 may provide the reference voltage points/bands as explained below in connection with FIG. 8. DOCS 211 may transmit an electricity market-based signal for voltage control as a real time price (UP) on reactive power, Q, to SEEMS 220. DOCS 211 may balance power using any resource within its control reach (wholesale electricity market, local solar PV plant, energy storage, and/or responsive load) based on the outcome of an optimal dispatch control running on it in real-time. For example, optimal source dispatch control (OSDC) 207 may receive as an input, wholesale electricity generation prices associated with coal-fired generation, nuclear power generation, natural gas generation; and/or other traditional non-renewable electric power generation resources, and may send one or more signals to distribution network 222 via DOCS SCADA interface 210 to use a solar PV plant or energy storage in place of the traditional non-renewable electric power generation resources if the cost of the solar PV plant or energy storage is cheaper. The wholesale electricity market may be cost of electricity sold by companies that produce power using traditional non-renewable electric generation resources. The DOCS 211 functions may further include coordinated voltage control (CVC) (e.g., Coordinated Voltage Control (CVC) 208) which maintains an appropriate voltage profile throughout the distribution system, for example, within the American National Standards Institute (ANSI) standard. In some embodiments, the voltage profile may be based on another standard (e.g., any of the many other standards in the World for voltage control). Higher penetration of solar PV may lead to voltage fluctuation and increased operation of traditional regulation devices. The purpose of the CVC 208 to properly coordinate the voltage along the feeder length, and thus manage reactive power generation by the solar PV, energy storage and other voltage-ampere reactance (VAR) compensation resources. The functions of DOCS 211 may also include operating during abnormal conditions, such as when electrical faults and a loss of communication takes place in the system. This functionality of the DOCS will ensure system integrity and reliability are maintained during these situations. In cases where abnormal situations occur, the DOCS 211 will fall back to emergency operation mode. In this mode, standard optimal solutions will be used that may be sub-optimal as real-time monitoring and feedback from the system may not be available for computing the optimal solution. It may also include forecasting of energy prices. For example, an electricity utility server, such as the electrical utility server 101 in FIG. 1, may receive forecasts of these energy prices, electricity generators, or third parties. The DOCS 211 can also be equipped with the functionality of forecasting energy prices for the utility. For this purpose, multiple factors such as forecasted wholesale energy market data, demand forecasting, factors related to available resources and their utilization, weather forecasting, energy storage and distributed generation (DG) forecasting information may be used.

Another function of the DOCS may be a communication hub for SEEMS 220. In the case of a centralized control architecture, the DOCS may need to act as a communication link between SEEMS 220 and the utility or utility DMS/ADMS 203. It will be capable of passing real-time price (RTP) and any emergency override control signals to SEEMS controllers (e.g. SEEM-To-Device Controller interface 219). It will also communicate the system status to the utility DMS/ADMS 203.

DOCS-to-DMS Comms 204 may comprise one or more wired or wireless radios that send control signals from DOCS 211 to utility DMS/ADMS 203. These control signals may comprise forecasted wholesale energy market data, demand forecasting data, factors related to available resources and their utilization, weather forecasting data, energy storage, and distributed generation forecasting data. These control signals may be received at DOCS 211 from utility DMS/ADMS 203. Microgrid service interface 205 may include a processor executing one or more computer-executable instructions that provide a software or middleware interface between DOCS 211 and SEEMS 220, In some embodiments, the service interface may be a hardware interface that enables signals to be transmitted to a corresponding service interface in SEEMS 220. Telemetry and control 206 records one or more utility distribution system (e.g., distribution system 212) values including, but not limited to, real power, reactive power, and phase angles. Telemetry and control 206 may transmit these values to SEEMS 220 or utility DMS/ADMS 203. Optical Source Dispatch Control (OSDC) 207 may comprise a processor executing one or more computer-executable instructions, and/or power electronics that are used to allocate one or more utility distribution system resources (e.g., Battery Control (Bat Cntrl 223) and/or PV Control (PV Cntrl 224)). DOCS supervisory control and data acquisition (SCADA) interface 210 may comprise a processor executing one or more computer-executable instructions and/or power electronics that are used to control the power electronics that connect, or cause, one or more utility distribution system resources (e.g., a battery connected to Bat Cntrl 223 and/or a solar PV resource connected to PV Cntrl 224) to connect to distribution network 222. DOCS-to-SEEMS Comms 209 may comprise a processor executing one or more computer-executable instructions and/or wired or wireless radios that are used to send control signals from DOCS 211 to the SEEMS-to-DOCS Comms 214 in SEEMS 220.

SEEMS 220 is the control system designed to monitor, optimize and control the energy sources available at the enterprise or local microgrid level (commercial/industrial, campus, local microgrid, large buildings etc.). It may also be referred to as Level 1 control. SEEMS 220 may be a controller that optimizes real and reactive power allocation of groups of DER (including responsive load) at the point of grid interconnection (the PCC). Often, such a group of DER would comprise a microgrid. As the amount of DER generation, storage, and load at a given location increases, so does its value as a resource on the grid.

The components of SEEMS 220 include advanced optimal resource allocation (AORA), and a device controller interface (e.g., SEEMS-to-Device Controller Interface 219) between SEEMS 220 and the bus that Bat Cntrl 229, PV Cntrl 230, and Load Cntrl 231 are connected to. SEEMS-to Device Controller interface 219 may include a colt/volt-ampere reactive (VAR) control component, and load management control component. The volt/(VAR) control component may control the voltage and volt-amperes introduced to the bus bar, from the DERs attached to the bus bar, or from the distribution network 222. SEEMS 220, which may be implemented in software, hardware, firmware electronics, or any combination thereof, can correctly allocate energy resources, including local generation and responsive load, based on the current real-time price of energy, forecasted demand and generation data, user preferences, and the current state of all the resources connected to the system. Based on all the information gathered, for a forecasted horizon, SEEMS 220 can optimize the mix of resources to greatly reduce the cost of energy. For example, forecasted wholesale energy market data, demand forecasting data, factors related to available resources and their utilization, weather forecasting data, energy storage, and distributed generation (DG) forecasting data may be received from utility DMS/ADMS 203 via DOCS-to-SEEMS Comms 209 and SEEMS-to-DOCS Comms 214 for use by AORA 218. AORA. 218 may optimize resources at the point of connection to the grid, to an optimal allocation for the DER owner, but also in support of the grid a consequence of price and other signals received from DOCS 211.

The VAR control is a functional component of SEEMS 220 that may control the voltage at the PCC of the DER installed in a facility. The VAR control may control the voltage by injecting or absorbing reactive power at the PCC or the VAR control may either work together with DOCS 211 in order to execute the coordinated voltage control scheme or it may independently control the voltage at the PCC with its own voltage control capability. AORA 218 may include at least one or both of the following two approaches to maintain voltage within limits. A first approach may be to receive voltage high and low limit trajectories to use as constraints, and the second may be to receive a reactive power price signal to include in the cost minimization solution.

The load management control of SEEMS 220, may provide a flexible optimal control framework that includes price-responsive load as one of the resources to be optimally dispatched, and uses from a practical implementation point of view, a configurable means of prioritizing and controlling different types of loads. To this end, a Load Management Control Module (LMCM) comprising one or more power electronics responsive to a signal, may receive control commands from SEEMS-to-Device-Controller Interface 219 to allocate DERs or PV sources. The LMCM may be modular and scalable. It may prioritize loads by criticality, such as Emergency, Vital, and Non-vital. Loads may be classified as Non-controllable, Controllable-on/off, and Controllable-modulating. The LMCM may be a component of SEEMS-to-Device-Controller Interface 219, but may also be part of or distributed among other components of SEEMS 220.

Figure 4:
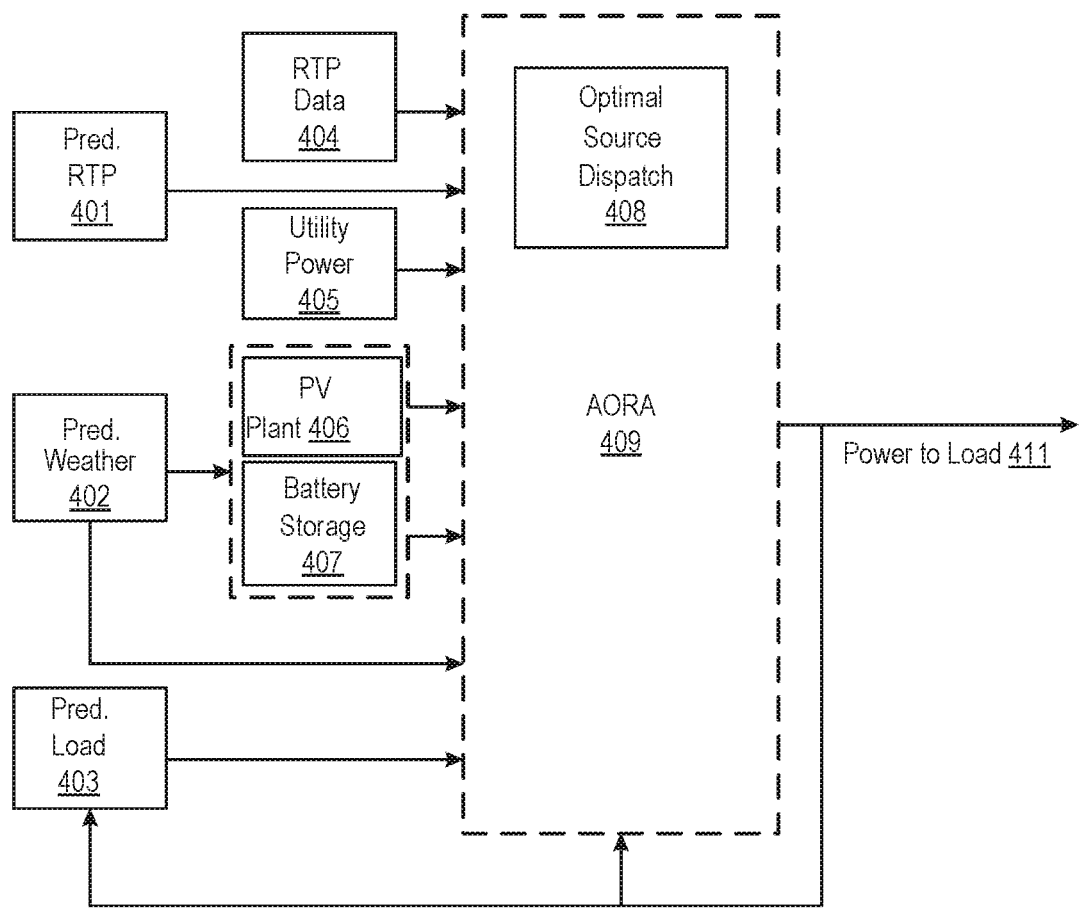
FIG. 4 depicts a resource allocation scheme, according to one or more example embodiments of the disclosure.

SEEMS 220 may comprise SEEMS-to-DOCS Comms 214, microgrid service implementation 215, model and state estimation 216, forecasting 217, and AURA 218, SEEMS-to-DOCS Comms 214 may comprise, a processor executing one or more computer-executable instructions, and wired or wireless radios that are used to send signals from SEEMS 220 to DOCS-to-SEEMS Comms 209 in DOCS 211. For example, the signals may include data about the DERs (e.g., battery controlled by Bat Cntrl 229, solar PV resource controlled by PV Cntrl 230, or a load controlled by Load Cntrl 231) and their availability to be allocated to provider power to one or more loads attached to the microgrid. The signals may also include data about the amount of power demanded by the one more loads (e.g., $P_L$ 228). Microgrid service implementation 215 may, comprise one or more computer-executable instructions that send requests for price profile information, to a server monitoring the price profile information, and may provide the price profile information to AURA 218, which may then in turn use the price profile information to allocate one or more DERs (e.g., Battery control (Bat Cntrl 229)), PV solar resources (e.g., PV control (PV Cntrl 230)), or perform load control (e.g., Load control (Load Cntrl 231)). The process of allocating the one or more DERs is illustrated in FIG. 4, and described in the corresponding paragraphs describing FIG. 4. Microrgrid service implementation 215 may be executed, for example, on electric utility server 101 of FIG. 1. The server from which the microgrid service implementation 215 may receive a response from may be a third party server storing wholesale electricity market data in real time. This server may be a server hosted by a company that generates electricity such as coal fired generation, natural gas generation, petrol generation, generation, etc.

Forecasting 217 may forecast demand for power by one or more loads and/or the supply of power available in one or more DERs, PV solar resources, or power that may be freed up via load control. Model and state estimation 216 may comprise, a processor executing one or more computer-executable instructions, to send requests to SEEMS-to-Device-Controller Interface 219 for data bout the power signals associated with one or more loads, and one or more DERs, PV solar resources, or power that may be freed up via load control, in order to model the behavior of microgrid 213 and estimate the state of microgrid 213 over a period of time. AORA 218 may comprise one or more computer-executable instructions executed on a processor that may cause SEEMS-to-Device-Controller Interface 219 to send control instructions to the one or more DERs, such as a battery controlled by Bat Cntrl 229, or PV solar resources, controlled by PV Cntrl 230, to provide power to the one or more loads. In some embodiments, the one or more computer-executable instructions may cause SEEMS-to-Device-Controller Interface 219 to control the load of one or more, of the one or more loads. SEEMS-to-Device-Controller Interface 219 may comprise one or more power electronics, such that when the SEEMS-to-Device Controller Interface 219 receives a control signal from a component in SEEMS 220 (e.g., AORA 218) it may connect one or more DERs to a bus bar that the one or more loads are connected to based on the cost of the one or more DERs. For example, if the cost of solar PV resources decreases in cost, relative to the cost of using battery storage, to provide power to the one or more loads, SEEMS-to-Device-Controller Interface 219 may connect the corresponding solar PV resources to the bus bars and may disconnect the battery storage form the bus bars.

Distribution network 222 may be connected to the corresponding distribution network of microgrid 213, via point of common coupling (PCC). Power may be transferred bidirectional at the PPC (e.g., $P_{PCC}$ 225), between distribution network 222 and the corresponding distribution network of microgrid 213. Power system 202 illustrates the relationship between the connection of distribution network 222 and the microgrid PCC 295. At PPC 295 the power delivered in the opposite direction to that of $P_{PCC}$ 225 may be $P_{Bat}$ 226, $P_{PV}$ 227, $P_L$ 228. $P_{Bat}$ 226 may be battery power transferred, from a battery, to a bus bar connected to the PCC. $P_{PV}$ 227 may be the power transferred, from a solar PV resource, to the bus bar connected to the PCC. $P_L$ 228 maybe the power drawn from the distribution network 22 through.

Figure 3:
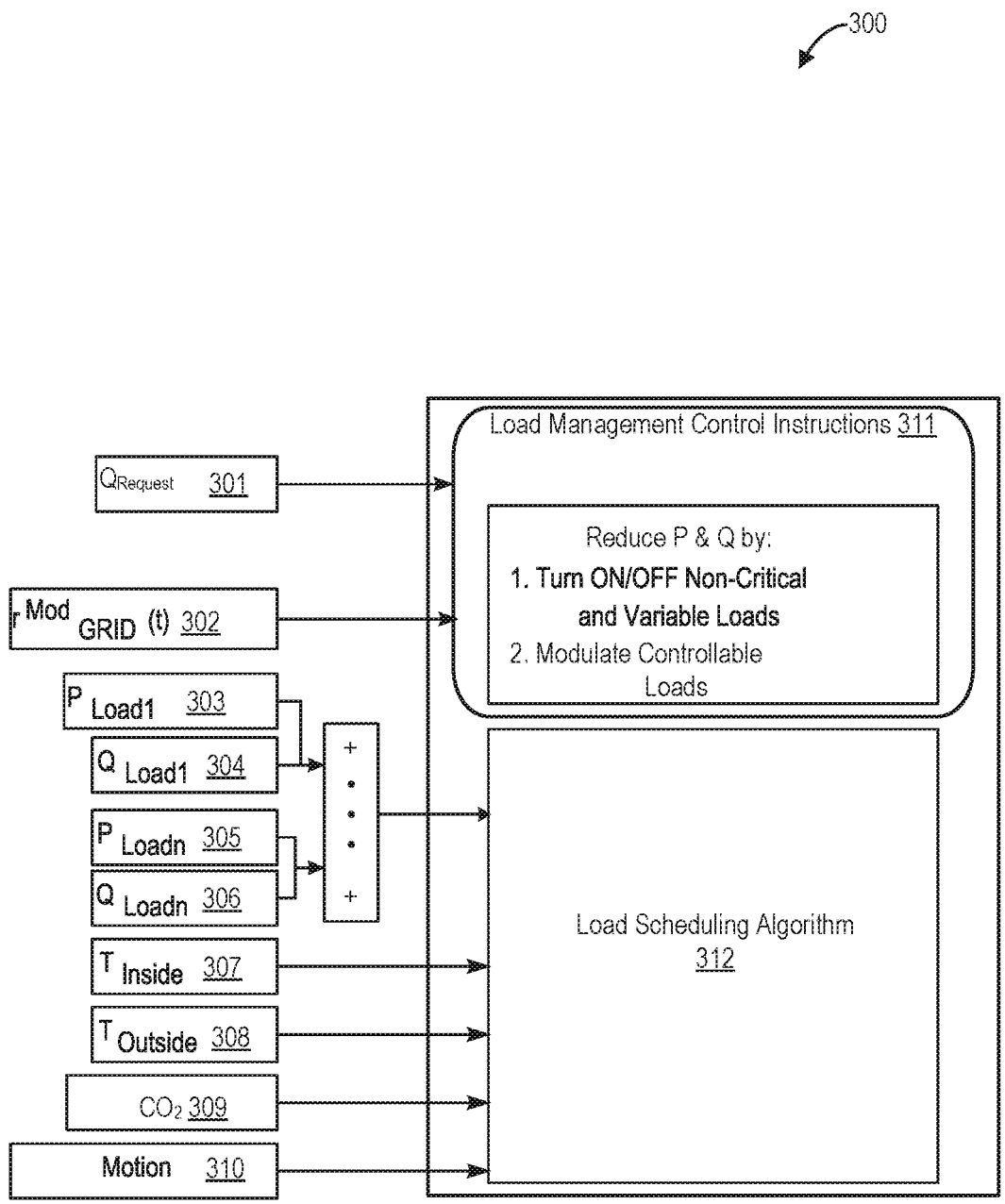
FIG. 3 depicts a load management control module (LMCA), according to one or more example embodiments of the disclosure.

FIG. 3 depicts a load management control module (LMCM) 300, according to one or more example embodiments of the disclosure. Load management control module (LMCM) 300 may comprise one or more computer-executable instructions (e.g., load management control instructions 311) that may be executed by one or more processors in SEEMS 220 that will in turn cause SEEMS-to-Device-Controller Interface 219 to adjust real power (P) and/or reactive power (Q) at one or more loads connected to microgrid 213. In some embodiments, LMCM 300 may adjust, or reduce, the real power or reactive power by turning on or turning off non-critical and/or variable loads. An example of a non-critical and variable load may be a pool pump used to control the circulation of water through a pool. For instance, LMCM 300 may disable a pool pump in order to reduce the amount of real power drawn from the utility distribution system or microgrid. The pool pump may be a load connected to the microgrid and may be controlled by Load Cntrl 231.

This process may also be referred to as reducing the load on the utility distribution system or microgrid. A pool pump may be considered to be a non-critical load. LMCM 300 may reduce the amount of reactive power introduced into the utility distribution system or microgrid as a result of a motor in the pool pump being connected to the utility distribution system or microgrid. LMCM 300 may do this by turning disabling the pool pump to prevent excessive amounts of reactive power being generated in the utility distribution system or microgrid. LMCM 300 may also modulate a duty cycle associated with the pool pump to lengthen the period of time that the motor is off and shorten the period of time that the motor is on when the utility distribution system or microgrid is beginning to experience excessively high levels of reactive power. Alternatively, LMCM 300 may modulate the duty cycle to shorten the period of time that the motor is off and lengthen the time the motor is on when the utility distribution system or microgrid are not under threat of experiencing excessively high levels or reactive power. LMCM 300 may receive a request to reduce reactive power (e.g., $Q_{Request}$ 301) wherein the request may comprise computer-executable instructions causing one or more power electronic devices to reduce the amount of reactive power introduced into the utility distribution system or microgrid, by turning off loads introducing reactive power into the utility distribution system or microgrid. LMCM 300 may receive the request from one or more of the components in DOCS 211. LMCM 300 may also receive computer-executable instruction from the one or more components in DOC S 211, to modulate controllable loads (e.g., $r^{Mod}_{GRID}(t)$ 302).

LMCM 300 may reduce the real and reactive power in accordance with load management control instructions 311 by applying a load scheduling algorithm (e.g., load scheduling algorithm 312). Load scheduling algorithm 312 may receive real power signals and reactive power signals from telemetry devices communicatively coupled to one or more loads. For example there may be N loads and LMCM 300 may receive real power signals (e.g., $P_{Load\ 1}$ 303, . . . , $P_{Load\ N}$ 305) and reactive power signals (e.g., $Q_{Load\ 1}$ 304, . . . , $Q_{Load\ N}$ 306) from telemetry devices communicatively coupled to the one or more loads. LMCM 300 may also receive internal temperature signals (e.g., $T_{inside}$ 307), external temperature signals (e.g., $T_{outside}$ 308), carbon dioxide ($CO_2$) signals (e.g., $CO_2$ 309), motion signals (e.g., motion 310) from sensors associated with a structure comprising the one or more loads. Based on the real and reactive power signals and signals received from the one or more sensors load scheduling algorithm 312 may schedule one certain loads of the one or more loads will be enabled or disabled over a period of time.

FIG. 4 depicts a resource allocation scheme (e.g., advanced optimal resource allocation (AORA) 409), according to one or more example embodiments of the disclosure. AORA 409 may be implemented on one or more processors, which may be the one or more processors implementing other components in SEEMS 220. In particular, AORA 409 may be realized as computer-executable instructions executed by the one or more processors. AORA 409 may be the same as AORA 218 in SEEMS 220 in FIG. 2. AORA 409 may consider various power sources (e.g., solar, battery and grid) to meet the demand for power at the one or more loads while minimizing the total cost of energy. In order to select the combination of these power sources, in an optimal way (select the power sources costing the least amount of power), a forecasted load profile, the forecasted PV power profile, and a real-time grid pricing (RTP) signal are used. AORA 409 may input the amount of power forecasted to be consumed by a load (forecasted load profile), the forecast of the amount of power generated by solar PV resources (forecasted PV power profile), and the RIP signal for power generated by the utility distribution system. These inputs may be received from the utility DMS/ADMS 203 via DOCS 211. AORA 409 may allocate the DERs or solar PV resources that should be assigned to supply the power to cover the demand for power at the load, based on the cost RTP, forecasted load profile, and forecasted PV power profile. AORA 409 may forecasts the PV profile and the load profile using, for example, a feedforward neural network, as explained below. The optimal selection may be based on an SBMPC. AORA 409 enables PV power to be sold, or transfer power, to the utility and the energy storage, or batteries, to perform both charge and discharge operations. AORA 409 may enable the microgrid to sell power back, or transfer power back, to the utility by sending a signal to SEEMS-to-Device-Controller Interface 219, which may cause DERs such as batteries and solar PV resources to transfer power to the utility distribution system via the PCC. For instance, the signal sent from AORA 409 to SEEMS-to-Device-Controller Interface 219, may cause SEEMS-to-Device-Controller Interface 219 to send one or more control signals to Bat Cntrl 229 to transfer power (e.g., $P_{Bat}$ 226) or send one or more control signals to PV Cntrl 230 to transfer power (e.g., $P_{pv}$ 227) to distribution network 222 via the PCC. The power associated with the solar PV provided by the microgrid, may be denoted by ($P_{PV}$) and is denoted as $P_{PV}$ 227 in FIG. 2. The power provided by the utility distribution system to a microgrid, when the microgrid is attached to the utility distribution system, may be denoted by $P_G$, and is denoted as $P_{PCC}$ 225 in FIG. 2. The power associated with energy storage, may be denoted by $P_{ES}$, and is denoted by $P_{Bat}$ 226 in FIG. 2. Each of these values may be sampled as the input to the SBMPC. A predicted load may be denoted by $P_{LOAD}$. $P_{LOAD}$ is denoted as $P_L$ 228.

AORA 409 may comprise optimal source dispatch 408. Optimal source dispatch 408 may allocate the power sources based on a predicted RTP (e.g., Pred. RTP 401), predicted weather (e.g., Pred. Weather 402), predicted load (e.g., Pred. Load 403), RTP data (e.g., RTP Data 404), power provided by the utility distribution system to the microgrid (e.g., utility 405), solar PV power (e.g., PV plant 406), and energy storage (e.g., battery storage 407). Optimal source dispatch 408 may allocate the power sources (solar PV resources, battery storage, or power from the utility distribution network) by sending a signal to SEEMS-to-Device-Controller Interface 219, instructing SEEMS-to-Device-Controller Interface 219 to send signals to Bat Cntrl 229, PV Cntrl 230, or the PCC to transfer power to the bus bar that the load is connected to based on, for example, the cost of the power sources. For instance, if solar PV resources are the cheapest of the power sources, AORA 409 will send a signal to SEEMS-to-Device-Controller Interface 219 with instructions that may cause SEEMS-to-Device-Controller Interface 219 to send one or more signals to PV Cntrl 230 to supply power to the bus bar to meet the power demands of the load. If the supply of power provided by solar PV resources connected to PV Cntrl 230 does not meet the demand of the load, SEEMS-to-Device-Controller Interface 219, may send one or more signals to a controller associated with the next cheapest power source (e.g., battery storage). In the instance that battery storage is the next cheapest option, SEEMS-to-Device-Controller Interface 219 may send a control signal to Bat Cntrl 229 to supply power to the bus bar to meet the remaining power demands of the load. If the supply of power provided by battery storage does not meet the remaining demand of the load, SEEMS-to-Device-Controller Interface 219, may send one or more signal to a controller at the PCC associated with power delivered to the microgrid from distribution network 222. The power needed to meet the remaining demand for power at the load may be provided by distribution network 222. The power provided by distribution network 22 may be denoted by $P_{PCC}$ 225.

RTP data 404 may be a real time price signal associated with the cost of power provided by the utility distribution system to the microgrid (e.g., utility 405). Pred. Weather 402 may be a forecast of the weather over a certain time horizon (e.g., 24 hours, 48 hours, 72, hours, . . . , one week or a month). Pred. Load 403 may be the predicted demand for power at one or more loads. PV plant 406 may be the amount of power generated by one or more solar PV resources. Pred. RTP 401, RTP Data 404, and utility power 405 (e.g., power provided by distribution network 222 denoted by $P_{PCC}$ 225) may be provided the utility. For example, Pred. RIP 401 and RIP Data 404 may be provided to AORA 218 from Utility DMS/ADMS 203 via DOCS 211.

The power required to be provided by the utility distribution system ($P_G$, which may also be denoted by $P_{GRID}$) to the microgrid, may be equal to the predicted load ($P_{LOAD}$) less the solar PV power ($P_{pv}$) and power stored in energy storage ($P_{ES}$). The power required by the grid may be expressed as equation (1):

$$P_{GRID}(t_k) = P_{LOAD}(t_k) - P_{PV}(t_k) - P_{ES}(t_k)$$

$P_{ES}$ may be the actual value computed based on the state of charge ($SOC_{ES}$) of the energy storage. $P_{ES}(t_k)$ is the energy storage power charging and discharging operation. A negative value indicates that the energy storage is charging, and a positive value indicates that the energy storage is discharging. The state of charge may be expressed as $SOC_{ES}(t_{k+1}) = SOC_{ES}(t_{k+1}) - \eta P_{ES}(t_k)$. The cost function may be expressed as equation (2):

$$J = \sum_{t_k=t_0}^{t_n} (r_G(t_k) * P_G(t_k) + r_{PV} * P_{PV}(t_k) + r_{ES} * P_{ES}(t_k)) * \Delta t$$

The time step $\Delta t = t_k - t_{k-1}$ for all k, and $r_G(t_k) = w\overline{r_G(t_k)}$ if $P_G(t_k) < 0$, and $r_G(t_k) = \overline{r_g(t_k)}$ if $P_G(t_k) \geq 0$. $J(t_{k+1})$ is the cost incurred from time $t_k$ to $t_{k+1}$. $r_G(t_k)$ may be the cost of power provided by the utility distribution system (e.g., $P_{PCC}$ 225), $r_{pv}$ may be the cost of power provided by a solar PV resource (e.g., $P_{PV}$ 227), and $r_{ES}$ may be the cost of power provided by battery storage or energy storage (e.g., $P_{Bat}$ 226), The weight, w, can be any value between zero and one. This range of values incorporates differential pricing that distinguished between the sell-to-grid from the buy-from-grid rates. As a result, SEEMS 220 will prioritize charging the energy resource via Bat Cntrl 229, for example, as opposed to immediately selling stored energy at a RTP. J is the power that is distributed to the load (e.g., power to load 411). Power to load 411 may be a control signal sent to SEEMS-to-Device-Controller Interface 219 that may cause SEEMS-to-Device-Controller Interface 219 to provide power to the load based on the optimization of the cost function. For example, if SBMPC optimizes J at a time $t_k$ and the cheapest costing power source is a solar PV resource, then AORA 218 may send a signal to SEEMS-to-Device-Controller interface 219 that will cause SEEMS-to-Device-Controller interface 219 to send a signal to PV Cntrl 230 to transfer power $P_{PV}$ 227 to the load. Power to load 411 corresponds to the power generated by the solar PV resource connected to PV Cntrl 230.

The SBMPC may be implemented by AORA 409, and may include a heuristic expression that provides an estimated minimum cost-to-goal from the current cost of power to the goal cost of power. In AORA 409, a heuristic is established that assumes that the predicted load at any time step can be fulfilled entirely by the cheapest power source for that time interval. The heuristic expression represents a summation of the lowest cost terms associated with each power source. For example, in a first time interval, $t_0$ to $t_1$ the cheapest power source may be a solar PV resource compared to power provided by the utility distribution system or energy storage. In a second time interval, $t_1$ to $t_2$ the cheapest power source may be power provided by the utility distribution system compared to solar PV resource or energy storage. In a third time interval, $t_2$ to $t_3$ the cheapest power source may be power provided by the utility distribution system compared to solar PV resource or energy storage. This process may continue for N different intervals and may be generalized according to the following expression $H = +C_{s,1} + C_{s,2} + \ldots + C_{s,N}$, where s indicates the source of power. $C_{s,k}$, where $k \in 1, \ldots, N$ may be equal to $C_{G,k} = r_G(t_k) P_G(t_k) \Delta t$ if the price for power from utility distribution system is the cheapest. $C_{s,k}$ may be equal to $C_{PV,k} = r_{PV}(t_k) P_{PV}(t_k) \Delta t$ if the price for power from a solar PV resource is the cheapest. $C_{s,k}$ may be equal to $C_{ES,k} = r_{PV}(t_k) P_{PV}(t_k) \Delta t$ if the price for power from energy storage is the cheapest.

AORA 409 may use a feedforward neural network designed to forecast both the future available PV power and the future load demand for the required prediction horizon of the system. In this case, the feedforward neural network forecasts the needed values for the next 24 hours. The number of hidden layers and hidden neurons of each network are determined empirically based on the performance of the neural network models. The training function used for training the neural networks may be the Levenberg-Marquardt backpropagation algorithm, in which the weights and bias values of the network are updated using Levenberg-Marquardt backpropagation. The neural network model for forecasting the PV power consists of 8 input parameters, 2 hidden layers with 6 neurons in each layer, and 1 output neuron that represents the forecasted PV power at the specific time. The input parameters are: the hour of the day (0-23), the minutes of the hour (0, 15, 30, 45), the month number (1-12), day number (1-31), forecasted temperature, season: winter, spring, summer, fall (1-4), PV power value 24 hours before, and the PV power value 168 hours before i.e., 1 week before. The neural network model for forecasting the load demand consists of 9 input parameters, 2 hidden layers with 5 neurons in each layer, and 1 output neuron representing the forecasted load power demand at the specific time. The input parameters are: the hour of the day (0-23), the minutes of the hour (0, 15, 30, 45), the month number (1-12), day of the week (1-7), is weekend (0-1), forecasted temperature, season: winter, spring, summer, fall (1-4), load value 24 hours before, and the load value 168 hours before (1 week before). It is important to note that many other forecasting models, such as recurrent neural networks (RNN), support vector regressors (SVR), etc. can be used and integrated with the proposed SBMPC model. This implementation is not restricted to any particular forecasting model implementation. The output neuron is forecasted PV power at a specific time.

Figure 5:
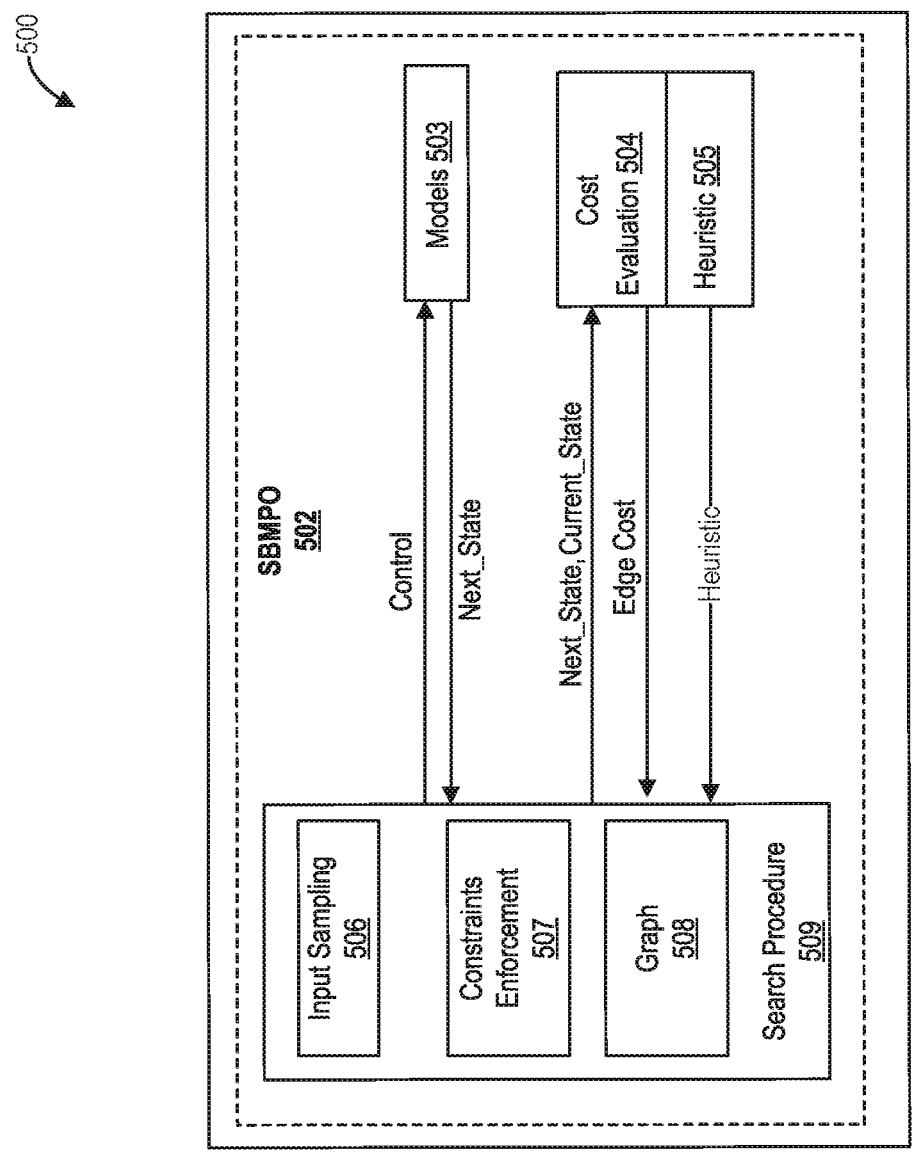
FIG. 5 depicts a control scheme for resource allocation, according to one or more example embodiments of the disclosure.

FIG. 5 depicts a control scheme for resource allocation, according to one or more example embodiments of the disclosure. SBMPO may be implemented as a sub-module of AORA 409, and is the basis of the optimization routine implemented by SBMPC. SBMPO 502 may receive as an input, via input sampling 506, a sample of the power available in one or more DERs (e.g., solar PV resources or energy storage), and may determine a cost of the cheapest DER to allocate to a load.

SBMPO may comprise an input sampling module (e.g., input sampling 506) that samples the power available in one or more DERs. Input sampling 506 may be s subcomponent of search procedure 509. Input sampling 506 may transmit a control signal to models 503 comprising the samples of the power available in the one or more DERS. Model 503, may generate a cost associated with providing power to the load from the one or more DERs and send a signal to search procedure 509 indicating what the cost will be to provide power to the load from the one or more DERs at a next time increment (next state). Search procedure 509, may then determine a graph 508 of the cost to provide power to the load from the one or more DERs at a current time increment (current state). Search procedure 509 may send a signal to cost evaluation 504 with the cost associated with current state and the cost associated with the next state. Cost evaluation 504 may determine edge cost, in accordance with FIG. 7. The edge cost is a difference in cost between the cost associated with the next state and the cost associated with the current state. Heuristic 205 may at the same time, provide a heuristic, as explained below, that provides a lower bound on the edge cost.

Model 503 is used to generate a graph 508 via input sampling, while cost evaluation 504 (the cost to move from one cost to another) and heuristic 505 (an estimate of the cost to move from the current cost to the goal cost) are based upon the cost function to be optimized. Model 503 may be a power system power propagation model produced by power system power propagation module 700 in FIG. 7. The heuristic is key to algorithm speedup. Sampling-Based Model Predictive Optimization (SBMPO) (e.g., SBMPO 502) samples power signals received from energy storage and generates a graph tree comprising nodes and branches in order to determine the optimal resource based on cost at a given time. SEEMS-to-Device-Controller Interface 219 may send a control signal to Bat Cntrl 229, to send data corresponding the amount of energy stored in a battery, or energy storage, connected to Bat Cntrl 229. Bat Cntrl 229 may sample the amount of energy stored in the battery, or energy storage, and may send a signal to SEEMS-to-Device-Controller interface 219 with the sampled amount of energy. SEEMS-to-Device-Controller Interface 219 may receive a signal from Bat Cntrl 229 with data corresponding to the amount of energy stored in the batter, or energy storage, and may send the data to SBMPO 502 which may be a sub-component of AORA 409. SBMPO 502 may perform the steps in FIG. 10. In general, SBMPO 502 may send control signals (Control) to models 503 and models 503 may send a next state signals (Next_State) to SBMPO 502. SBMPO 502 may send next state (Next_State) or current state (Current_State) signals to cost evaluation 504, and cost evaluation 504 may send a cost signal to SBMPO 502. Heuristic 505 may transmit a heuristic signal (Heuristic) to SBMPO 502. The heuristic signal may be based on the heuristic expression above.

Figure 6:
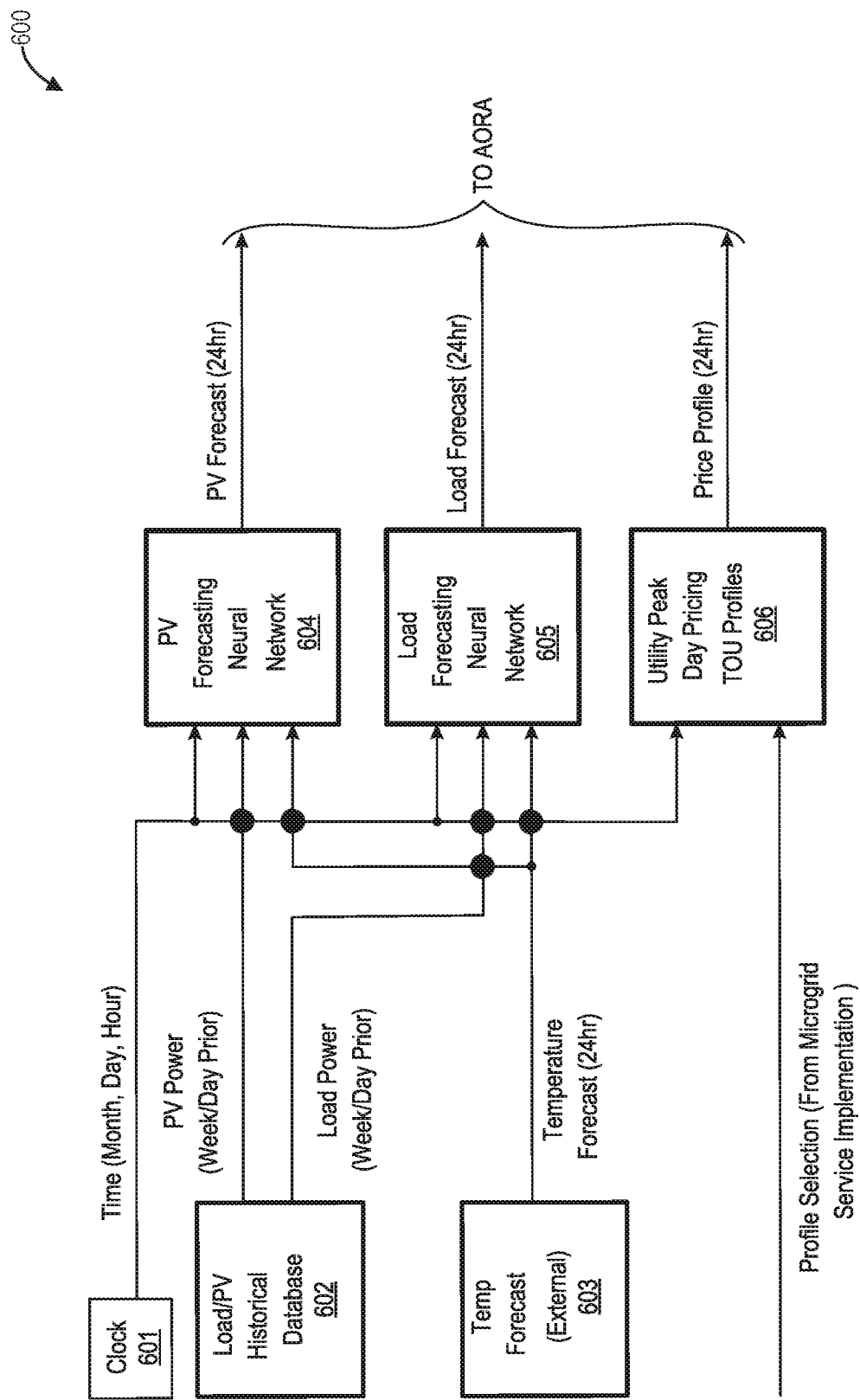
FIG. 6 depicts a forecasting module, according to one or more example embodiments of the disclosure.

FIG. 6 depicts a forecasting module, according to one or more example embodiments of the disclosure. Forecast module 600 may be implemented by Forecasting 217. Forecasting module 600 may comprise several sub-modules. Clock 601 may transmit a time (month, day, hour) to a solar PV forecasting neural network (e.g., PV Forecasting Neural Network 604), load forecasting neural network 605, and/or utility peak day pricing time of use (TOU) profiles 606. Load/PV historical database 602 may comprise historical power consumption data associated with one or more loads or historical power supply data associated with one or more solar PV sources. Load/PV Historical database 602 may transmit load power signals corresponding to the power consumed by the one or more load, or power supplied signals by the one or more solar PV sources, for the week or day prior to the time at which the load power signals and/or power supplied signals are sent to Load Forecasting Neural Network 605. Load/PV Historical database 602 may also transmit these signals to PV Forecasting Neural Network 604. Temp forecast (External) 603 may forecast an external temperature 24 hours in advance. Temp forecast (External) 603 may transmit the temperature forecast to PV forecasting neural network 604 and load forecasting neural network 605. PV forecasting neural network 604, load forecasting neural network 605, and utility peak day pricing TOU profiles 606 may transmit PV forecast signals, load forecast signals, and price profile signals for a period of 24 hours in the future AORA (e.g., AORA 409). TOU profiles 606 may be the TOU rates for a period of time (e.g., 12 hours or 24 hours).

Figure 7:
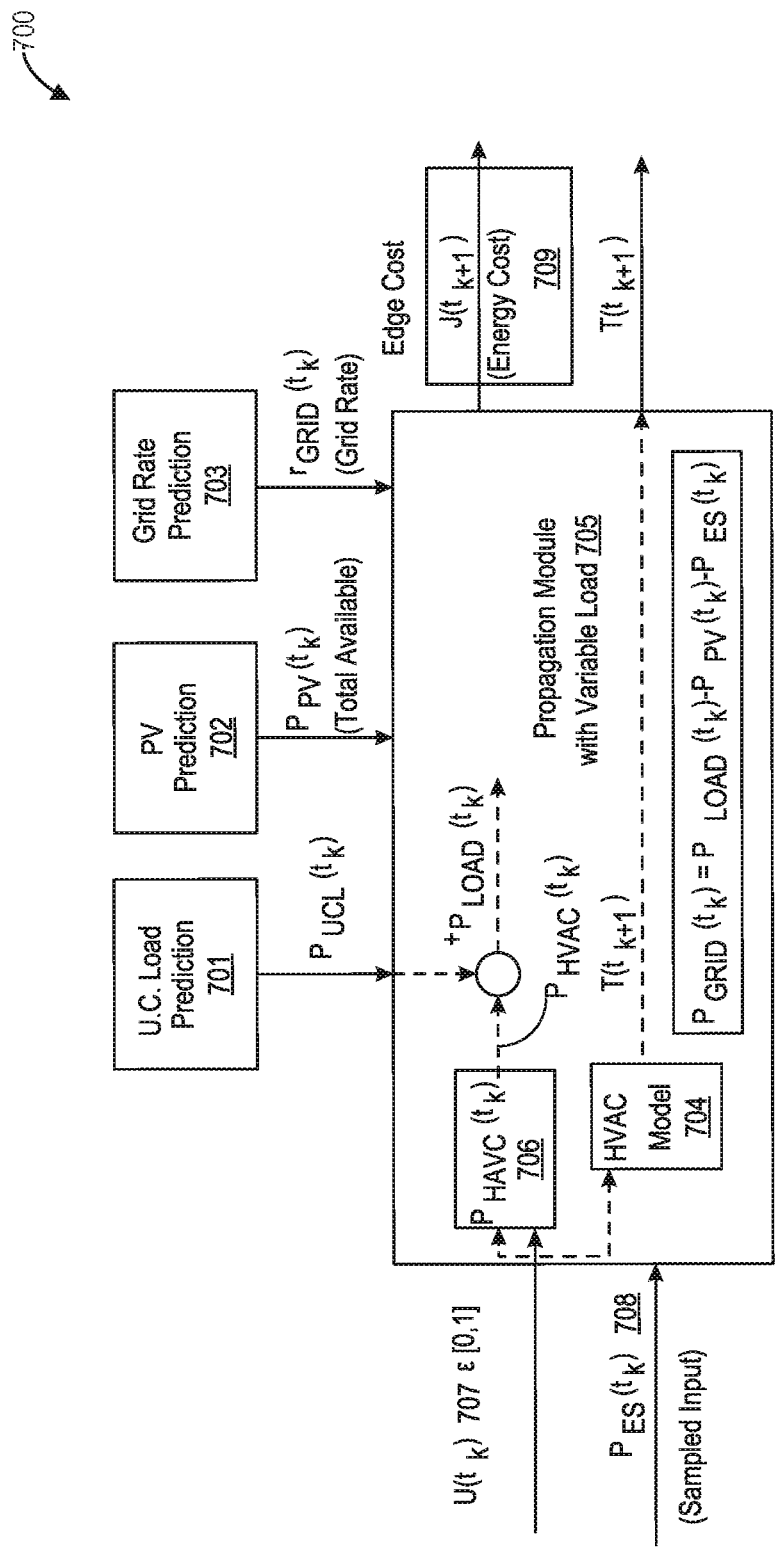
FIG. 7 depicts a power system power propagation module, according to one or more example embodiments of the disclosure.

FIG. 7 depicts a power system power propagation module 700, according to one or more example embodiments of the disclosure. Power system propagation module 700 may be included in models 503. Propagation module with variable load 705 may be used to generate a propagation model used in models 503. Propagation module with variable load 705 may receive a signal (e.g., $P_{UCL}(t_k)$) comprising prediction (e.g., uncontrolled (U.C.) load prediction 701), or estimate, of the amount of power that may be consumed by an uncontrollable load (e.g., a refrigerator). Propagation module with variable load 705 may receive a signal (e.g., $P_{PV}(t_k)$ comprising a prediction, or estimate, of the amount of power generated by solar PV (e.g., PV prediction 702). Propagation module with variable load 705 may receive a signal (e.g., $r_{GRID}(t_k)$) comprising a prediction, or estimate, of the cost of power generated by the utility distribution system (e.g., Grid rate prediction 703). Propagation module with variable load 705 may receive a signal (e.g., $U(t_k)$ 707) associated with a comfort level corresponding to a setting in an HVAC. $U(t_k)$ 707 may be a signal with discrete values between zero and one. Propagation module with variable load 705 may receive a signal (e.g., $P_{ES}(t_k)$ 708) comprising information about the amount of power that can be supplied by energy storage. HVAC model 704 may be one or more computer-executable instructions that model the behaviors of the HVAC during a period of time. $P_{LOAD}(t_k)$ may be the sum of $P_{HVAC}(t_k)$ 706 and $P_{UCL}(t_k)$. $P_{HVAC}(t_k)$ 706 is the power being consumed by the HVAC at time $t_k$. $P_{HVAC}(t_k)$ 706 outputs a power $P_{HVAC}(t_k)$ corresponding to the amount of power being consumed by the HVAC, as the HVAC is being adjusted by $U(t_k)$. $U(t_k)$ is a signal received by the HVAC that may cause, for example, the HVAC to run longer if a user is hot and adjusts a thermostat, attached to the HVAC, down a certain number of degrees. Propagation module with variable load 705 may determine the amount of power to be supplied by the utility distribution system ($P_{GRID}(t_k)=P_{LOAD}(t_k)-P_{PV}(t_k)-P_{ES}(t_k)$) and may determine an edge cost $J(t_{k+1})$ or energy cost (e.g., Energy Cost 709). As explained above once the propagation module determines the power to be supplied by the utility distribution system, and the power at the load, a solar PV resource, or energy storage (battery) ARA 409 may optimize the edge cost J to determine the resource (solar PV resource or energy storage) to allocate to the load. The edge cost, or cost function J, may be expressed as equation in (3):

$$J = w\sum_{k=0}^{n-i}[r_{GRID}(t_k)P_{GRID}(t_k) + r_{ES}(t_k)P_{ES}(t_k)]\Delta t + (1-w)\sum_{k=0}^{n-1}(T(t_k) - T_{ref})^2 \quad (3)$$

$$J = w\sum_{k=0}^{n-1}J(t_{k+1}) + (1-w)\sum_{k=0}^{n-1}(T(t_k) - T_{ref})^2. \quad (4)$$

The expression $$(1-w)\sum_{k=0}^{n-1}(T(t_k) - T_{ref})^2$$

may be a penalty to enforce comfort of consumers in a structure. As the HVAC is adjusted the value for w may change between 0 and 1, where values closer to 0 indicate a higher cost to the consumers but higher level of comfort to the consumers because the HVAC may be on for a longer period of time to keep the consumers cooler or warmer depending on the settings. Conversely, values closer to 1 indicate a lower cost to the consumer but a lower level of comfort to the consumers because the HVAC may be on for a shorter period of time in order to reduce the amount of power consumed by the HVAC thereby reducing the cost to the consumers. $T(t_k)$ is the temperature in the structure at time $t_k$, and $T_{ref}$ may be a reference (e.g., room temperature) that is set within the structure. The reference temperature may be based on a temperature that the average number of consumers in a structure feel comfortable at, averaged over a period of a year. For example, the average temperature over a period of year, within the structure, may be the reference temperature.

Figure 8:
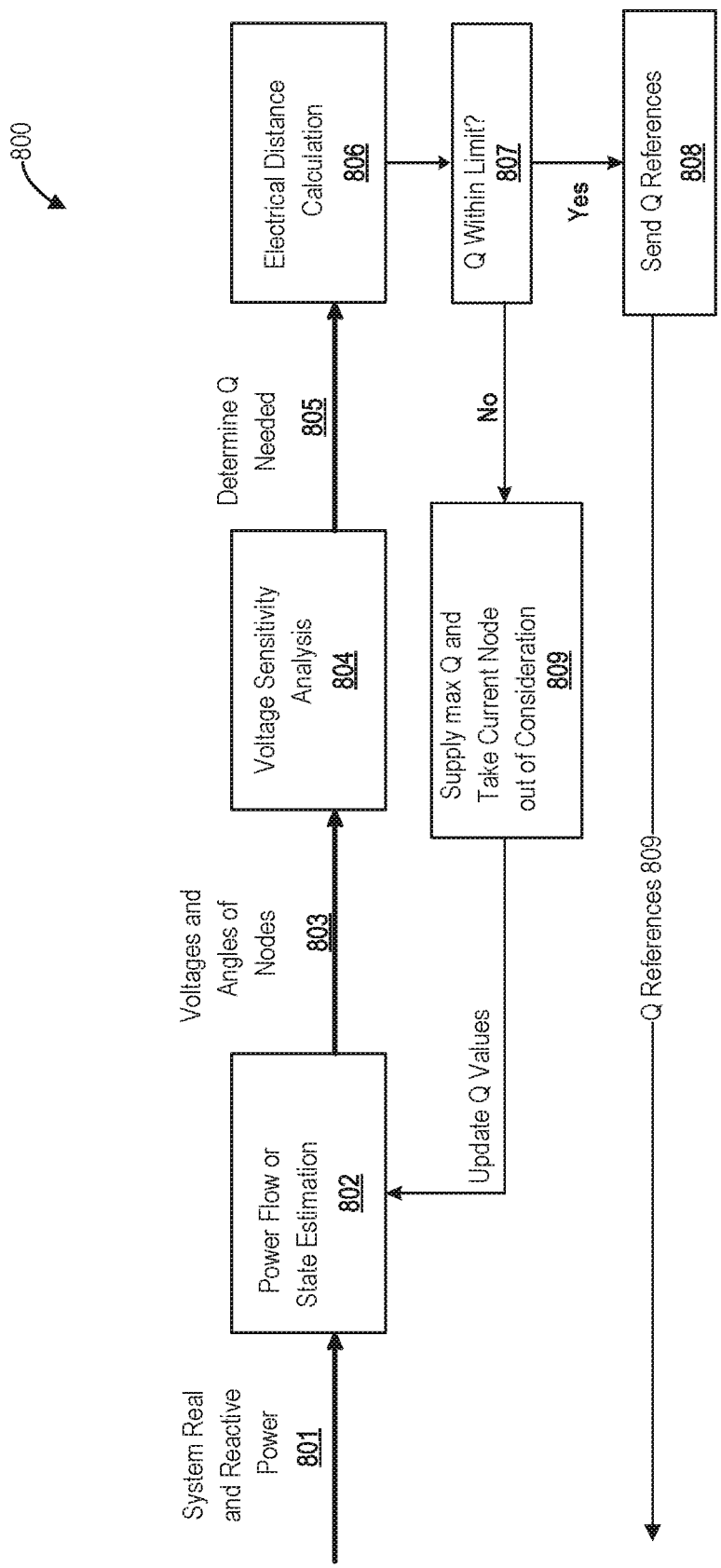
FIG. 8 depicts a coordinated voltage control, according to one or more example embodiments of the disclosure.

FIG. 8 depicts a coordinated voltage control 800, according to one or more example embodiments of the disclosure. Coordinated voltage control (CVC) module 800 may be an implementation of CVC 208. CVC module 800 may send control signals to one or more DOCS components and/or one or more SEEMS components to coordinate feeder voltage control between the utility distribution system and microgrid. For example, CVC 208 may send a control signal, to DOCS SCADA Interface 210, comprising instructions that cause DOCS SCADA Interface 210 to send signals to one or more resources (e.g., Bat Cntrl 223 and/or PV Cntrl 224) to apply a certain voltage to distribution network 222 so that the voltage provided by distribution network 22 at PCC 295 balances the voltage provided by the microgrid at PCC 295. To that end, CVC 208 may comprise one or more computer-executable instructions which when executed by a processor in DOCS 211 cause microgrid service interface 205 to send one or more control signals to SEEMS-to-Device Controller Interface 219 via Microgrid Service Interface 205 and Microgrid Service Implementation 215 that may cause SEEMS-to-Device-Controller Interface 219 to apply a voltage at PCC 295 that balances with the voltage applied by distribution network 222 at PCC 295.

CVC 800 regulates distribution system voltages to ensure compliance by coordinated dispatch of both distribution system and Microgrid assets, including switched capacitor banks, tap-changing transformers, and reactive power setpoints on both utility- and customer-owned inverters. CVC module 800 coordinates the available inverter interfaced DERs and traditional regulation devices to maintain the system-wide voltage within limits. Therefore, CVC module 800 coordinates the voltage control of the available traditional voltage regulation devices and the inverter interfaced DERs in the system. CVC module 800 maintains a system-wide voltage profile within certain limits, supervises reactive power generation between available DERs, and ensures optimum use of voltage regulation devices. When a voltage violation is detected the CVC module 800 may receive the real and reactive power demand of the loads as well as the real and reactive power generated by the utility distribution system. CVC module 800 may execute a power flow solver may be used to determine the voltages and angles. CVC module 800 may then conduct a voltage sensitivity analysis to determine the reactive power needed to get the system voltage within limits. CVC module 800 may determine the electrical distance to determine the best regulation device from which to supply the reactive power (Q). If the required Q is more than the allowable limit of the regulation device, the maximum Q available at the regulation device is provided and the algorithm takes the regulation device out of the list. Then the power flow solver is updated with the new system status and the next best regulation device. After determining the responses needed to get the system voltage within the limits, the algorithm sends the required reactive power references back to the system.

CVC module 800 may receive the utility distribution system's real and reactive power (e.g., system real and reactive power 801) signals and conduct a power flow or state estimation (e.g., power flow or state estimation 802) in order to determine the voltages and angle of voltages at different nodes 803 in the utility distribution system. For example, at a first node in the utility distribution system, the node may have a first voltage magnitude with a first angle, and second node in the utility distribution system may have a second voltage magnitude with a second angle. The first voltage magnitude and the second voltage magnitude may be different or the same. The first and second angles may be different or the same. CVC module 800 may conduct a voltage sensitivity analysis (e.g., voltage sensitivity analysis 804) to determine how adjusting the voltage magnitude and angles at different nodes may affect the transfer of real and reactive power throughout the utility distribution system. If a reactive power is needed in the utility distribution system. CVC module 800 may determine the reactive power (Q) required for a given distance (e.g., determine Q needed 805), and then may determine the electrical distance (e.g., electrical distance calculation 806) that the reactive power must travel from a point of injection to the utility distribution system. Before CVC module 800 injects the reactive power into the utility distribution system, CVC module 800 may determine whether the reactive power is within the limits (e.g., Q within limits 807). If it is not within the limits, CVC module 800 may inject the maximum reactive power at a given node and then remove that node from consideration for injection of reactive power to the utility distribution system for the next injection. CVC module 800 may then update the list of nodes that are available to inject reactive power, and may determine a power flow state estimation again (e.g., power flow or state estimation 802). If however the reactive power values are within the limits, CVC module 800 may transmit a signal with the corresponding reactive power values or Q references 809 (e.g., send 808 Q references). CVC module 800 may receive the system real and reactive power values from telemetry in the utility distribution system (e.g., distribution system 212), and may send the Q references to the utility distribution system.

Figure 9:
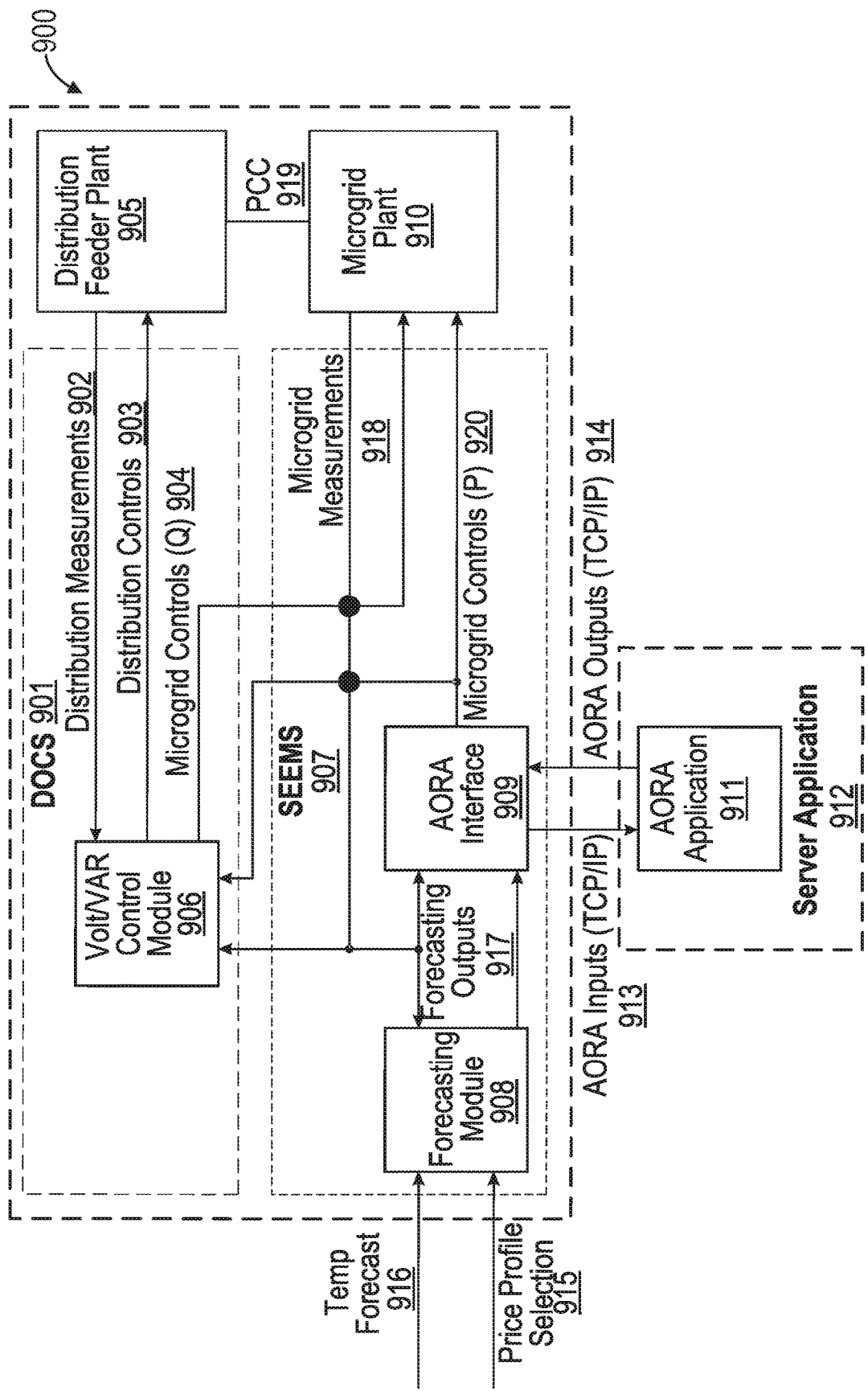
FIG. 9 depicts a messaging scheme of a control plane and power plane of a utility distribution system and microgrid, according to one or more example embodiments of the disclosure.

FIG. 9 depicts a messaging scheme of a control plane 900 of a utility distribution system and microgrid, according to one or more example embodiments of the disclosure. Control plane 900 illustrates the control signals sent in a control system, such as control system 201. DOCS 901 may comprise a voltage and voltage-ampere (VAR) control module (e.g., Volt/VAR control module 906) that may receive distribution measurements 902 from telemetry devices connected to different nodes with the utility distribution system. These nodes may be collocated with a distribution feeder plant (e.g., distribution feeder plant 905) that distributes power to utility distribution system endpoints (e.g., residential structures such as apartment buildings, condominiums, townhomes, standalone homes, commercial structures, and industrial structures) Volt/VAR control module 906 may send distribution control signals (e.g., distribution controls 903) to the distribution feeder plant with instructions to adjust the output of reactive and/or real power in the utility distribution system. Volt/VAR control module 906 may send microgrid control signals (e.g., microgrid controls (Q) 904) to a microgrid plant (e.g., microgrid plant 910) with instructions to adjust the output of reactive and/or real power to the microgrid (e.g., microgrid 213). Volt/VAR control module 906 may receive microgrid measurements (e.g., microgrid measurements 918) from telemetry devices connected to different parts of the microgrid.

SEEMS 907 may comprise a forecasting module (e.g., forecasting module 908) and AORA interface (e.g., AORA interface 909). Forecasting module 908 may be implemented in accordance with forecasting module 600 and AORA interface 909 may be implemented in accordance with AORA 409. Forecasting module 908 may receive temperature forecast signals (e.g., temp forecast 916) from one or more thermometers or thermostats in a physical structure (e.g., residential structure, commercial structure, industrial structure) and may output one or more forecasts (e.g., forecasting outputs 917) to AORA interface 909. Forecasting module 908 may also receive one or more price profile selections (e.g., price profile selection 915) and may use this to output one or more forecasts to AORA interface 909. AORA interface 909 may send one or more control signals (e.g., microgrid controls (P)) to microgrid plant 910 wherein the one or more control signals cause microgrid plant 910 to adjust the real power within the microgrid. In some embodiments, there may be a server that may enable a user to interact with DOCS 901 or SEEMS 907 via the transmission control protocol (TCP)/internet protocol (IP) suite of protocols. For example, server application 912 may host an AORA application (e.g., AORA application 911) that a user may be able to access and interact with different components in DOCS 901 and SEEMS 907. AORA interface 909 may output signals received as inputs (e.g., AORA Inputs (TCP/IP) 913) at AORA application 911. AORA application 911 may output signals (e.g., AORA Outputs (TCP/IP) 914) to AORA interface 909.

PCC 919 may be the PCC between the utility distribution system and the microgrid. PCC 919 may the same PCC as $P_{PCC}$ 225.

Figure 10:
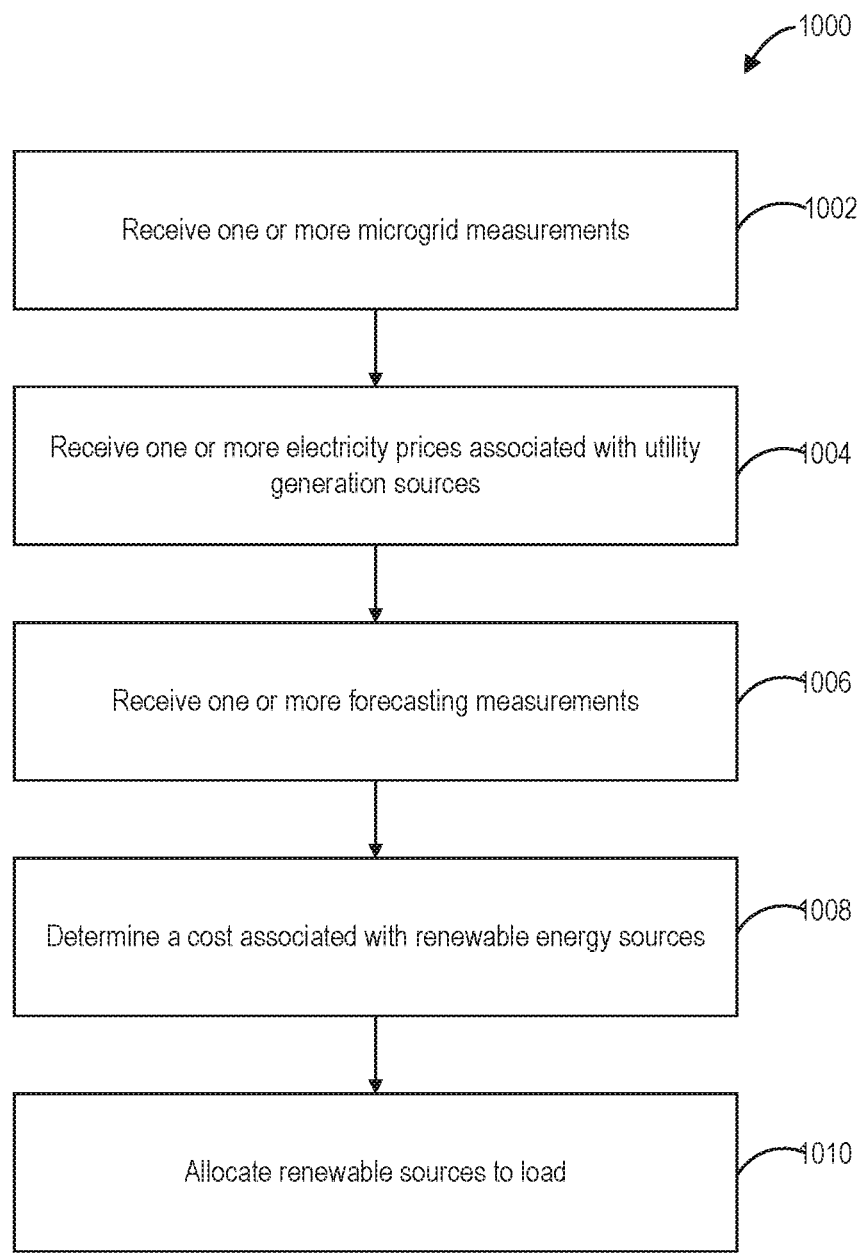
FIG. 10 depicts a process of optimizing a control scheme for resource allocation, according to one or more example embodiments of the disclosure.

FIG. 10 depicts a process 1000 of optimizing a control scheme for resource allocation, according to one or more example embodiments of the disclosure. At step 1002, the process may receive one or more microgrid measurements. For example, in FIG. 9, AORA 909, may receive one or more microgrid measurements 918 from microgrid plant 910. At step 1004, the process may receive one or more electricity prices associated with utility generation sources. For example, AORA 909 may receive RIP electricity prices from DOCS 901. In particular, DOCS 901 may receive one or more RIP signals from a utility DMS/ADMS, such as utility DMS/ADMS 203. At step 1006, the process may receive one or more forecasting measurements. For example, AORA 909 may receive the one or more forecasting measurements from Forecasting Module 908. At step 1008, the process may determine a cost associated with renewable energy sources. For example, AORA interface 909 may execute one or more computer-executable instructions on one or more processors (e.g., processor(s) 1414) to determine a cost associated with one or more renewable energy sources. At step 1010, the process may allocate the renewable sources to a load. For example, in FIG. 9, AORA Interface 909 may send one or more microgrid control signals (e.g., microgrid controls (P) 920 to microgrid plant 910. The one or more microgrid control signals may comprise instructions to allocate a solar PV resource to the load or allocate energy storage/battery storage to the load.

Figure 11:
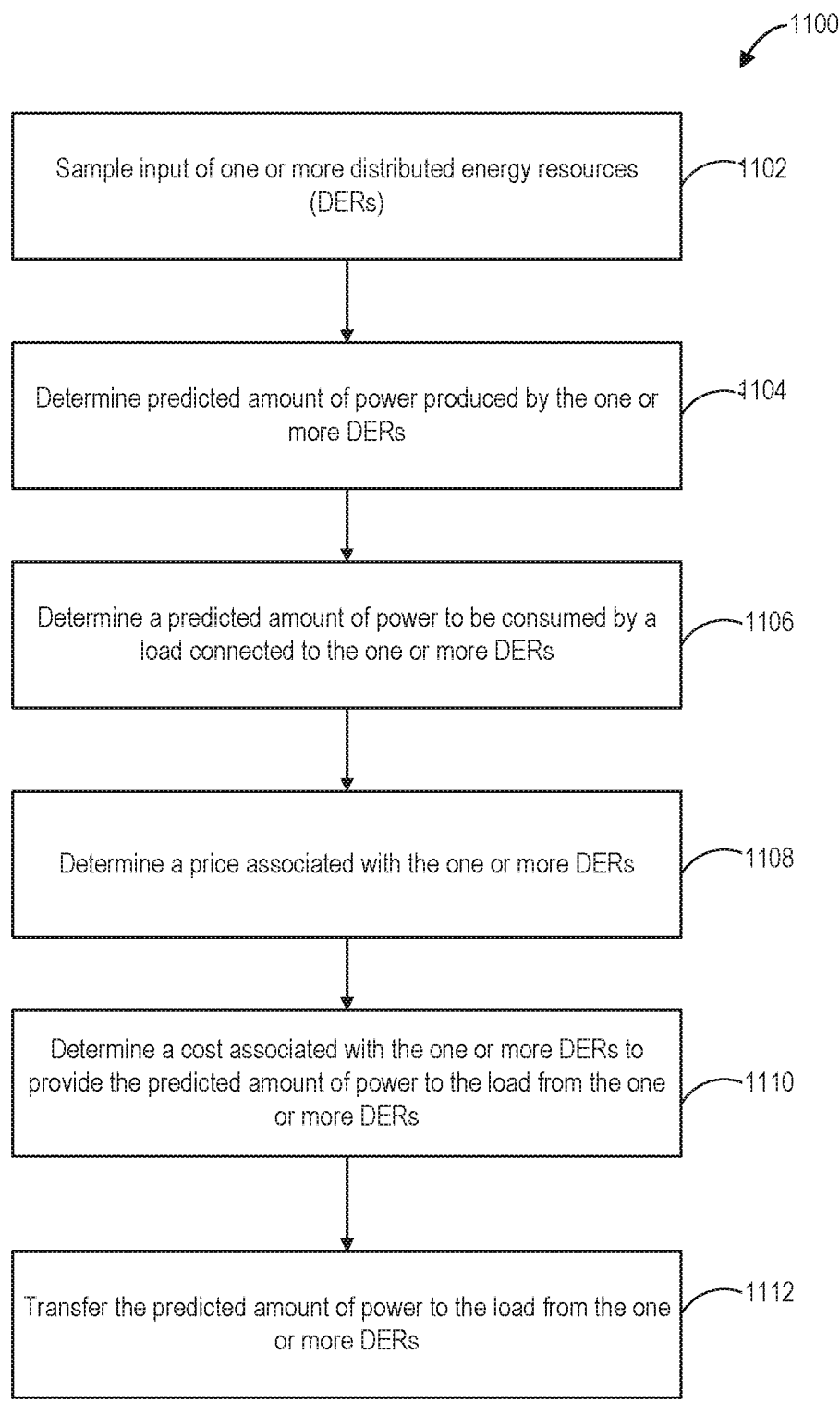
FIG. 11 depicts a process of optimizing a control scheme for resource allocation, according to one or more example embodiments of the disclosure.

FIG. 11 depicts a process 1100 of optimizing a control scheme for resource allocation, according to one or more example embodiments of the disclosure. At step 1102, the process may, sample the input of one or more distributed (DERs). At step 1104, the process may determine a predicted amount of power produced by the one or more DERs. At step 1106, the process may determine a predicted amount of power to be consumed by a load connected to the one or more DERs. At step 1108, the process may determine a price associated with the one or more DERs. At step 1110, the process may determine a cost associated with the one or more DERs to provide the predicted amount of power to the load from the one or more DERs. At step 1112, the process may transfer the predicted amount of power to the load from the one or more DERs.

Figure 12:
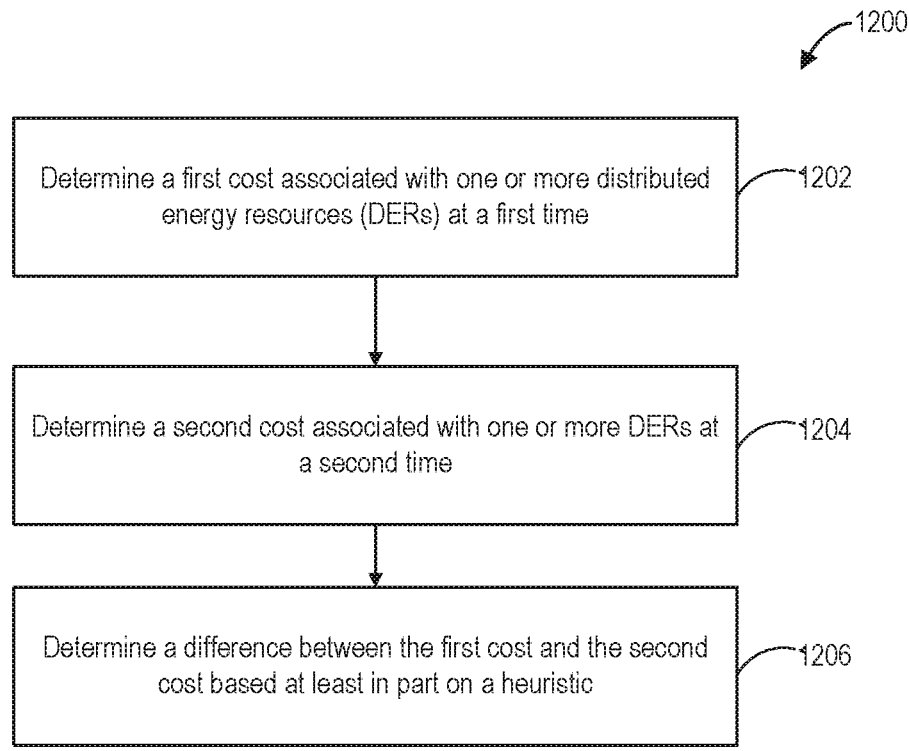
FIG. 12 depicts a process of optimizing a control scheme for resource allocation, according to one or more example embodiments of the disclosure.

FIG. 12 depicts a process 1200 of optimizing a control scheme for resource allocation, according to one or more example embodiments of the disclosure. At step 1202, the process may, determine a first cost associated with the one or more distributed energy resources (DERs) at a first time. At a step 1204, the process may determine a second cost associated with the one or more DERs at a second time. At step 1206, the process may determine a difference between the first cost and the second cost based on at least in part on a heuristic.

Figure 13:
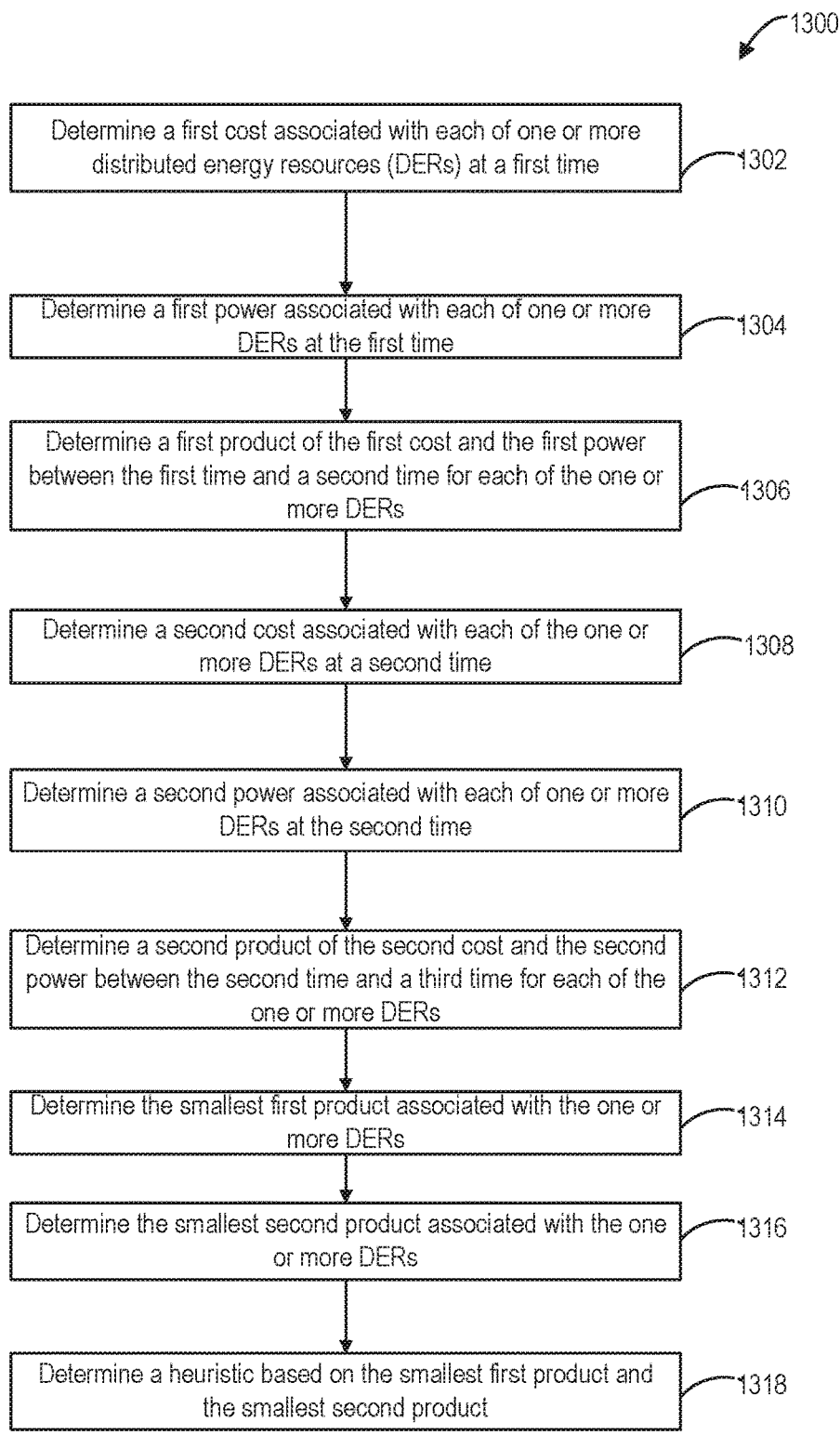
FIG. 13 depicts a process of optimizing a control scheme for resource allocation, according to one or more example embodiments of the disclosure.

FIG. 13 depicts a process 1300 of optimizing a control scheme for resource allocation, according to one or more example embodiments of the disclosure. At step 1302, the process may determine a first cost associated with each of the one or more distributed energy resources (DERs) at a first time. At step 1304, the process may determine a first power associated with each of the one or more DERs at the first time. At step 1306, the process may determine the first product of the first cost and the first power between the first time and a second time for each of the one or more DERs. At step 1308, the process may determine a second cost associated with each of the one or more DERs at a second time. At step 1310, the process may determine a second power associated with each of the one or more DERs at the second time. At step 1312, the process may determine a second product of the second cost and the second power between the second time and a third time for each of the one or more DERs. At step 1314, the process may determine the smallest first product associated with the one or more DERs. At step 1316, the process may determine the second product associated with the one or more DERs. At step 1318, the process may determine a heuristic based on the smallest first product and the smallest second product.

Figure 14:
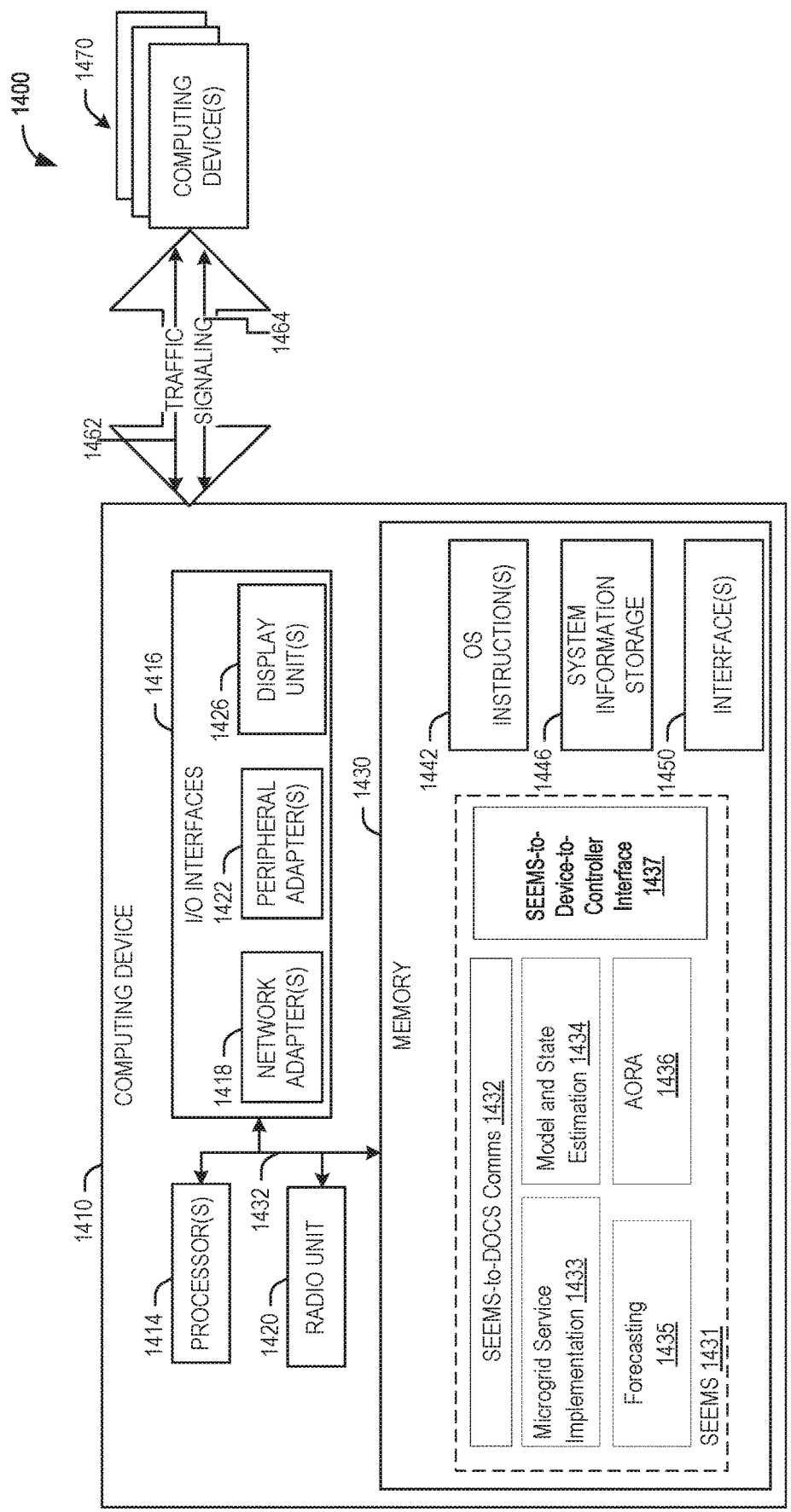
FIG. 14 depicts a hardware device, according to one or more example embodiments of the disclosure.

FIG. 14 depicts an exemplary computational environment, according to one or more example embodiments of the disclosure and illustrates an example of a computational environment 1400 for power control in accordance with one or more aspects of the disclosure. The example computational environment 1400 is only illustrative and is not intended to suggest or otherwise convey any limitation as to the scope of use or functionality of such computational environment's architecture. In addition, the computational environment 1400 should not be interpreted as having any dependency or requirement relating to any one or combination of components illustrated in this example computational environment. The illustrative computational environment 1400 can embody or can include, for example, DOCS 211, SEEMS 220, and/or any other computing device that can implement or otherwise leverage the power control features described herein.

The computational environment 1400 represents an example of a software implementation of the various aspects or features of the disclosure in which the processing or execution of the operations described in connection with the power control described herein, including the processing of information communicated (e.g., encoded, modulated, and/or arranged) in accordance with this disclosure, can be performed in response to the execution of one or more software components at the computing device 1410. It should be appreciated that the one or more software components can render the computing device 1410, or any other computing device that contains such components, a particular machine for the power control described herein. A software component can be embodied in or can comprise one or more computer-accessible instructions, e.g., computer-readable and/or computer-executable instructions. At least a portion of the computer-accessible instructions can embody one or more of the example techniques disclosed herein. For instance, to embody one such method; at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 1410 or other computing devices. Generally, such program modules comprise computer code, routines, programs, objects, components, information structures (e.g., data structures and/or metadata structures), etc., that can perform particular tasks (e.g., one or more operations) in response to execution by one or more processors, which can be integrated into the computing device 1410 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or features of the disclosure in connection with power control, including the processing of information communicated (e.g., encoded, modulated; and/or arranged) in accordance with the features described herein, can comprise personal computers; server computers; laptop devices; handheld computing devices, such as mobile tablets; wearable computing devices; and multiprocessor systems. Additional examples can include set-top boxes, programmable consumer electronics, network PCs, minicomputers, mainframe computers, blade computers, programmable logic controllers, distributed computing environments that comprise any of the above systems or devices, and the like.

As illustrated, the computing device 1410 can comprise one or more processors 1114, one or more input/output (I/O) interfaces 1416, a memory 1430, and a bus architecture 1432 (also termed bus 1432) that functionally couples various functional elements of the computing device 1410. The bus 1432 can include at least one of a system bus, a memory bus, an address bus, or a message bus, and can permit the exchange of information (data, metadata, and/or signaling) between the processor(s) 1414, the I/O interface(s) 1416, and/or the memory 1430, or the respective functional elements therein. In scenarios in which the processor(s) 1414 include multiple processors, the computing device 1410 can utilize parallel computing.

The I/O interface(s) 1416 can permit or otherwise facilitate the communication of information between the computing device and an external device, such as another computing device, e.g., a network element or an end-user device. Such communication can include direct communication or indirect communication, such as the exchange of information between the computing device 1410 and the external device via a network or elements thereof. As illustrated, the I/O interface(s) 1416 can comprise one or more of network adapter(s) 1418, peripheral adapter(s) 1422, and display unit(s) 1426. Such adapter(s) can permit or facilitate connectivity, between the external device and one or more of the processor(s) 1414 or the memory 1430. In one aspect, at least one of the network adapter(s) 1418 can couple functionally the computing device 1410 to one or more computing devices 1470 via one or more traffic and signaling pipes 1160 that can permit or facilitate exchange of traffic 1462 and signaling 1464 between the computing device 1410 and the one or more computing devices 1470. Such network coupling provided at least in part by the at least one of the network adapter(s) 1418 can be implemented in a wired environment, a wireless environment, or both. The information that is communicated by the at least one network adapter can result from the implementation of one or more operations in a method of the disclosure. Such output can be any form of visual representation including, but not limited to, textual, graphical, animation, audio, tactile, and the like. In certain scenarios, computing devices 1470 may be anyone of Bat Cntrl 229, PV Cntrl 230, or Load Cntrl 231. In addition or in the alternative, the display unit(s) 1426 can include functional elements (e.g., lights, such as light-emitting diodes; a display, such as a liquid crystal display (LCD), combinations thereof, or the like) that can permit control of the operation of the computing device 1410, or can permit conveying or revealing the operational conditions of the computing device 1410.

Radio Unit 1420 may comprise one or more processors, transceivers, and antennas communicatively coupled to the one or more processors and transceivers. Radio Unit 1420 may transmit and receive signals using the antenna and transceiver.

In one aspect, the bus 1432 represents one or more of several possible types of bus structures, including a memory bus or memory controller, a peripheral bus, an accelerated graphics port, and a processor or local bus using any of a variety of bus architectures. As an illustration, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component interconnects (PCI) bus, a PCI-Express bus, a Personal Computer Memory Card industry Association (PCMCIA) bus, a Universal Serial Bus (USB), and the like. The bus 1432, and all buses described herein, can be implemented over a wired or wireless network connection, and each of the subsystems, including the processor(s) 1414, the memory 1430 and memory elements therein, and the I/O interface(s) 1416 can be contained within one or more remote computing devices 1470 at physically separate locations, connected through buses of this form, in effect implementing a fully distributed system.

The computing device 1410 can comprise a variety of computer-readable media. Computer-readable media can be any available media (and non-transitory) that can be accessed by a computing device. In one aspect, computer-readable media can comprise computer non-transitory storage media (or computer-readable non-transitory storage media) and communications media. Example computer-readable non-transitory storage media can be any available media that can be accessed by the computing device 1410, and can comprise, for example, both volatile and non-volatile media, and removable and/or non-removable media. In one aspect, the memory 1430 can comprise computer-readable media in the form of volatile memory, such as random access memory (RAM), and/or non-volatile memory, such as read-only memory (ROM).

The memory 1430 can comprise SEEMS 1431, comprising SEEMS-to-DOCS Comms 1432, Microgrid Service Implementation 1433, Forecasting 1435, Model State Estimation 1434, AGRA 1436, and SEEMS-to-Device-to Controller Interface 1437. Such information can include at least one of code instructions, information structures, or the like. At least one of the one or more interfaces 1450 (e.g., application programming interface(s)) can permit or facilitate the communication of information between two or more components within the functionality SEEMS 1431. The information that is communicated by the at least one interface can result from implementation of one or more operations in a method of the disclosure.

In addition, the memory 1430 can comprise computer-accessible instructions and information (e.g., data and/or metadata) that permit or facilitate the operation and/or administration (e.g., upgrades, software installation, any other configuration, or the like) of the computing device 1410. Accordingly, as illustrated, the memory 1430 can comprise a memory element 1442 (labeled OS instruction(s) 1442) that contains one or more program modules that embody or include one or more operating systems, such as Windows operating system, Unix, Linux, Symbian, Android, Chromium, and substantially any operating system suitable for mobile computing devices or tethered computing devices. In one aspect, the operational and/or architectural complexity of the computing device 1410 can dictate a suitable operating system. The memory 1430 also comprises a system information storage 1446 having data and/or metadata that permits or facilitates the operation and/or administration of the computing device 1410. Elements of the OS instruction(s) 1442 and the system information storage 1446 can be accessible or can be operated on by at least one of the processor(s) 1414.

The computing device 1410 and/or one of the computing device(s) 1470 can include a power supply (not shown), which can power up components or functional elements within such devices. The power supply can be a rechargeable power supply, e.g., a rechargeable battery, and it can include one or more transformers to achieve a power level suitable for operation of the computing device 1410 and/or one of the computing device(s) 1470, and components, functional elements, and related circuitry therein. In certain scenarios, the power supply can be attached to a conventional power grid to recharge and ensure that such devices can be operational.

In one aspect, the power supply can include an I/O interface (e.g., one of the network adapter(s) 1418) to connect operationally to the conventional power grid. In another aspect, the power supply can include an energy conversion component, such as a solar panel, to provide additional or alternative power resources or autonomy for the computing device 1410 and/or one of the computing device(s) 1470.

The computing device 1410 can operate in a networked environment by utilizing connections to one or more remote computing devices 1470. As an illustration, a remote computing device can be a personal computer, a portable computer, a server, a router, a network computer, a peer device or other common network node, and so on. As described herein, connections (physical and/or logical) between the computing device 1410 and a computing device of the one or more remote computing devices 1470 can be made via one or more traffic and traffic 1462 or signaling 1464 which can comprise wireline link(s) and/or wireless link(s) and several network elements (such as routers or switches, concentrators, servers, and the like) that form a local area network (LAN) and/or a wide area network (WAN). Such networking environments are conventional and commonplace in dwellings, offices, enterprise-wide computer networks, intranets, local area networks, and wide area networks.

Blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:
1. A method comprising:
   determining, by one or more computer processors coupled to at least one memory, at a first time, a first cost associated with one or more renewable energy sources within a microgrid, determining, by the one or more computer processors, at a second time, a second cast associated with the one or more renewable energy sources with in the microgrid, determining, by the one or more computer processors, a heuristic based on the first cost and the second cost;

determining, by the one or more computer processors, based on the heuristic, an estimated cost associated with the one or more renewable energy sources within the microgrid;

determining, by the one or more computer processors, based on the estimated cast, an allocation of the one or more renewable energy sources within the microgrid to one or more loads in the microgrid;

generating one or more control signals based on the allocation of the one or more renewable energy sources within the microgrid; and causing to send the control signals to one or more controllers in the microgrid.

2. The method of claim 1, wherein the one or more renewable energy sources comprise solar photovoltaic (PV) plants, wind farms, or piezoelectric energy scavenging devices.

3. The method of claim 1, wherein the allocation of the one or more renewable energy sources within the microgrid is based on a lowest costing renewable energy source of the one or more renewable energy sources.

4. The method of claim 1, wherein the allocation of the one or more renewable energy sources within the microgrid is based on a sample based model predictive optimization (SBMPO) of the one or more renewable energy sources.

5. The method of claim 4, wherein the SBMPO is based on the estimated cost.

6. The method of claim 1, wherein the one or more controllers comprise at least one solar PV controller.

7. A device comprising:
at least one memory storing computer-executable instructions; and
at least one processor configured to access the at least one memory and execute the computer-executable instructions to:
determine, by one or more computer processors coupled to at least one memory, at a first time, a first cost associated with one or more renewable energy sources within a microgrid;
determine, by the one or more computer processors, at a second time, a second cost associated with the one or more renewable energy sources within the microgrid;
determine, by the one or more computer processors, a heuristic based on the first cost and the second cost;
determine, by the one or more computer processors, based on the heuristic, an estimated cost associated with the one or more renewable energy sources within the microgrid; and
determine, by the one or more computer processors, based on the estimated cost, an allocation of the one or more renewable energy sources within the microgrid to one or more loads in the microgrid;
wherein the at least one processor is further configured to access the at least one memory and execute the computer-executable instructions to:
generate one or more control signals based on the allocation of the one or more renewable energy sources within the microgrid; and
cause to send the control signals to one or more controllers in the microgrid.

8. The device of claim 7, wherein a controller of the one or more controllers comprise at least one solar PV controller.

9. The device of claim 7, wherein the one or more renewable energy sources comprise solar photovoltaic (PV) plants, wind farms, or piezoelectric energy scavenging devices.

10. The device of claim 7, wherein the allocation of the one or more renewable energy sources within the microgrid is based on a lowest costing renewable energy source of the one or more renewable energy sources.

11. The device of claim 7, wherein the allocation of the one or more renewable energy sources within the microgrid is based on a sample based model predictive optimization (SBMPO) of the one or more renewable energy sources.

12. The device of claim 11, wherein the SBMPO is based on the estimated cost.

13. A method comprising:
determining, by one or more computer processors coupled to at least one memory, at a first time, a first cost associated with a renewable energy source within a microgrid;
determining, by the one or more computer processors, at the first time, a first power associated with the renewable energy source within the microgrid;
determining, by the one or more computer processors, a first product, wherein the first product is a product of the first cost and the first power associated with the renewable energy source within the microgrid between the first time and a second time, and wherein a plurality of first products includes the first product;
determining, by the one or more computer processors, at the second time, a second cost associated with the renewable energy source within the microgrid;
determining, by the one or more computer processors, at the second time, a second power associated with the renewable energy source within the microgrid;
determining, by the one or more computer processors, a second product, wherein the second product is a product of the second cost and the second power associated with the renewable energy source within the microgrid between the second time and a third time, and wherein a plurality of second products includes the second product;
determining, by the one or more computer processors, a smallest first product of the plurality of first products;
determining, by the one or more computer processors, a smallest second product of the plurality of second products;
determining, by the one or more computer processors, a heuristic based on the smallest first product and the smallest second product;
determining, by the one or more computer processors, based on the heuristic, a plurality of estimated costs associated with the renewable energy source with in the microgrid;
determining, by the one or more computer processors, based on the plurality of estimated costs, an allocation of the renewable energy source within the microgrid to one or more loads in the microgrid;
generating one or more control signals based on the allocation of the renewable energy source within the microgrid; and
causing to send the control signals to one or more controllers in the microgrid.

14. The method of claim 13, wherein the allocation of the renewable energy source within the microgrid is based on a sample based model predictive optimization (SBMPO) of the renewable energy source.

15. The method of claim 14, wherein the SBMPO is based on the plurality of estimated costs.

16. The method of claim 13, wherein the renewable energy source comprises a solar photovoltaic (PV) plant, a wind farms, or a piezoelectric energy scavenging device.

17. The method of claim 13, wherein the allocation of the renewable energy source within the microgrid is based on a lowest costing renewable energy source.

* * * * *